US012681669B2

(12) United States Patent
Yamamuro et al.

(10) Patent No.: US 12,681,669 B2
(45) Date of Patent: Jul. 14, 2026

(54) DATA MANAGEMENT APPARATUS AND DATA MANAGEMENT METHOD

(71) Applicants: TOYOTA JIDOSHA KABUSHIKI KAISHA, Toyota (JP); SCALAR, INC., Tokyo (JP)

(72) Inventors: Naoki Yamamuro, Nagoya (JP); Wataru Fukatsu, Tokyo (JP)

(73) Assignees: TOYOTA JIDOSHA KABUSHIKI KAISHA, Toyota (JP); SCALAR, INC., Tokyo (JP)

( * ) Notice: Subject to any disclaimer, the term of this patent is extended or adjusted under 35 U.S.C. 154(b) by 2 days.

(21) Appl. No.: 17/972,977

(22) Filed: Oct. 25, 2022

(65) Prior Publication Data

US 2023/0153036 A1      May 18, 2023

(30) Foreign Application Priority Data

Sep. 22, 2021    (JP) ................................. 2021-154131

(51) Int. Cl.
     *G06F 3/06*                (2006.01)
(52) U.S. Cl.
     CPC ............ *G06F 3/067* (2013.01); *G06F 3/0604* (2013.01); *G06F 3/0655* (2013.01)
(58) Field of Classification Search
     CPC ....... G06F 3/067; G06F 3/0604; G06F 3/0655
     USPC ........................................................ 711/154
     See application file for complete search history.

(56) References Cited

U.S. PATENT DOCUMENTS

| | | | |
|---|---|---|---|
| 10,742,423 B1 * | 8/2020 | Yan | H04L 9/0643 |
| 10,972,349 B1 * | 4/2021 | Branton | H04L 63/126 |
| 11,632,293 B2 * | 4/2023 | Yamada | H04L 9/50 709/224 |
| 2018/0225640 A1 * | 8/2018 | Chapman | G06Q 20/401 |
| 2020/0050613 A1 * | 2/2020 | Gauvreau, Jr. | G06F 16/28 |
| 2021/0233104 A1 * | 7/2021 | Shrinivasan | G06F 16/1834 |
| 2021/0334802 A1 * | 10/2021 | Zhang | G06F 21/64 |

FOREIGN PATENT DOCUMENTS

| | | |
|---|---|---|
| EP | 3 832 510 A1 | 6/2021 |
| JP | 2014-042214 A | 3/2014 |
| WO | 2019/228560 A2 | 12/2019 |
| WO | 2020/055413 A1 | 3/2020 |

OTHER PUBLICATIONS

Gipp et al., "Decentralized Trusted Timestamping using the Currency Bitcoin," arxiv.org, Cornell University Library, Ithaca, NY, Feb. 13, 2015.

* cited by examiner

*Primary Examiner* — Gautam Sain
(74) *Attorney, Agent, or Firm* — Oliff PLC

(57)          ABSTRACT

As a record RA1 is stored in a first distributed ledger, a controller of a client server obtains a time stamp token T0 for a record hash value RH1 thereof and has a record RB0 including the time stamp token T0 stored in a second distributed ledger. Then, as a record RA2 is stored in the first distributed ledger, the controller obtains a time stamp token T1 for a record hash value RH2 of the record RA2. Then, the controller has a record RB2 including the time stamp token T1 and a record hash value of the record RB0 stored in the second distributed ledger.

13 Claims, 19 Drawing Sheets

FIG.2

DISTRIBUTED LEDGER SET 50

DISTRIBUTED LEDGER 51

| Key | Age | Obj-HV | Nonce | Sig | Prev-HV | HV |
|-----|-----|--------|-------|-----|---------|-----|
| k1 | 0 | OH1 | ... | ... | ... | H1 |
| k1 | 1 | OH2 | ... | ... | H1 | H2 |
| k1 | 2 | OH3 | ... | ... | H2 | H3 |

DISTRIBUTED LEDGER 52

| Key | Age | Obj-HV | Nonce | Sig | Prev-HV | HV |
|-----|-----|--------|-------|-----|---------|-----|
| k2 | 0 | TM1 | ... | ... | ... | Ha |
| k2 | 1 | TM2 | ... | ... | Ha | Hb |
| k2 | 2 | TM3 | ... | ... | Hb | Hc |

FIG.4

FUNCTION TO RESPOND TO FIRST OPERATION

FUNCTION TO RESPOND TO SECOND OPERATION

FUNCTION TO RESPOND TO THIRD OPERATION

FIG.7

FUNCTION TO RESPOND TO FOURTH OPERATION

RECEIVE FIRST REQUEST

START

S1

GENERATE NONCE VALUE

S2

GENERATE HASH VALUE OF TARGET DATA

S3

GENERATE ELECTRONIC SIGNATURE

S4

GENERATE TRANSACTION DATA

S5

TRANSMIT TRANSACTION DATA

END

FIG.15

LEDGER SET 60

LEDGER 67

| Key | Age | Obj-HV | Nonce | Sig | Prev-HV | HV |
|-----|-----|--------|-------|-----|---------|-----|
| k1 | 0 | OH1 | ... | ... | ... | H1 |
| k1 | 1 | OH2 | ... | ... | H1 | H2 |
| k1 | 2 | OH3 | ... | ... | H2 | H3 |

LEDGER 68

| Key | Age | Obj-HV | Nonce | Sig | Prev-HV | HV |
|-----|-----|--------|-------|-----|---------|-----|
| k2 | 0 | TM1 | ... | ... | ... | Ha |
| k2 | 1 | TM2 | ... | ... | Ha | Hb |
| k2 | 2 | TM3 | ... | ... | Hb | Hc |

FIG.16

SUSPENSION TABLE

| Key | Nonce |
|-----|-------|
| k1 | ... |

FIG.17

COMMIT TABLE 374

COMMIT DATA 375

| Key | Age | Obj-HV | Nonce | Sig | Prev-HV | HV |
|-----|-----|--------|-------|-----|---------|-----|
| k1 | 0 | OH1 | ... | ... | ... | H1 |
| k1 | 1 | OH2 | ... | ... | H1 | H2 |
| k1 | 2 | OH3 | ... | ... | H2 | H3 |

COMMIT DATA 376

| Key | Age | Obj-HV | Nonce | Sig | Prev-HV | HV |
|-----|-----|--------|-------|-----|---------|-----|
| k2 | 0 | TM1 | ... | ... | ... | Ha |
| k2 | 1 | TM2 | ... | ... | Ha | Hb |
| k2 | 2 | TM3 | ... | ... | Hb | Hc |

RECEIVE FOURTH REQUEST

START

S71

GENERATE RECORD HASH
VALUE OF TERMINAL RECORD
IN COMMIT DATA 376

S72

CREATE CLIENT CERTIFICATE

S73

TRANSMIT CLIENT CERTIFICATE

END

DATA MANAGEMENT APPARATUS AND DATA MANAGEMENT METHOD

BACKGROUND

Field

The present disclosure relates to a data management apparatus and a data management method for managing data based on a distributed ledger technology.

Description of the Background Art

By obtaining a time stamp token for electronic data, existence of the electronic data at the time recorded in the time stamp token has conventionally been proven (proof of existence) and the fact that the electronic data has not been tampered after that time has conventionally been proven (proof of integrity).

The time stamp token has an expiration date. Therefore, a technique to prove existence and integrity beyond the expiration date of the time stamp token has been studied.

For example, Japanese Patent Laying-Open No. 2014-42214 discloses a data proof system that performs processing for extending an expiration date of a long-term signature with the use of a time stamping technology. This data proof system creates an ESR table in which original document proof information (ES-A) that proves non-tampering of a plurality of original files is summarized and performs processing for extending the expiration date of the ESR table. Processing load is thus lower than in an example where processing for extending the expiration date is performed for each ES-A (see Japanese Patent Laying-Open No. 2014-42214).

Though the data proof system disclosed in Japanese Patent Laying-Open No. 2014-42214 addresses lowering in processing load imposed thereon, it does not address improvement in tamper resistance of a time stamp token.

SUMMARY

The present disclosure was made to solve problems above, and an object of the present disclosure is to enable proof of validity of a time stamp token beyond an expiration date and to improve tamper resistance of the time stamp token.

(1) A data management apparatus according to one aspect of the present disclosure is a data management apparatus that manages data based on a distributed ledger technology. The data management apparatus includes a storage device where a distributed ledger is stored, a controller that updates the distributed ledger, and a communication apparatus configured to communicate with a time stamp authority that provides a time stamp token. The distributed ledger includes a first distributed ledger where a record including information on the data is stored in a time-series manner and a second distributed ledger where a record including the time stamp token obtained from the time stamp authority is stored in a time-series manner. The controller obtains a first time stamp token which is a time stamp token for information on a terminal record in the first distributed ledger from the time stamp authority through the communication apparatus and causes a record including the first time stamp token to be stored in the second distributed ledger.

According to the configuration, the first time stamp token obtained for the information on the terminal record in the first distributed ledger is managed in the second distributed ledger. In order to tamper the first time stamp token stored in the second distributed ledger, all records subsequent to the record including the time stamp token should be tampered, and it is difficult to tamper the first time stamp token. Even when a certain first time stamp token stored in the second distributed ledger expires, the fact that the first time stamp token that had expired has not been tampered can be proven by the records subsequent to the record including the first time stamp token. Therefore, even when the first time stamp token expires, validity thereof can be proven.

(2) In one embodiment, the information on the terminal record in the first distributed ledger is a hash value of the terminal record.

According to the configuration, the time stamp token is obtained for the hash value of the terminal record stored in the first distributed ledger. In other words, since the record itself stored in the first distributed ledger is not sent to the time stamp authority, the record itself can be concealed at the time when the time stamp token is obtained.

(3) In one embodiment, the first time stamp token is obtained in accordance with an operation by a user onto the data management apparatus.

According to the configuration, the user can obtain the first time stamp token and have the first time stamp token stored in the second distributed ledger at any timing.

(4) In one embodiment, when a record is added to the first distributed ledger, the controller obtains the first time stamp token for that record.

According to the configuration, each time a record is added to the first distributed ledger, the first time stamp token can automatically be obtained and stored in the second distributed ledger.

(5) In one embodiment, the controller obtains from the time stamp authority through the communication apparatus, a second time stamp token which is a time stamp token for information on a terminal record in the second distributed ledger and causes a record including the second time stamp token to be stored in the second distributed ledger.

According to the configuration, by obtaining the second time stamp token for the information on the terminal record in the second distributed ledger, existence and integrity of the information on the terminal record can be proven. Proof of existence and proof of integrity of the information on the terminal record can prove the fact that the record (that is, the time stamp token) stored in the second distributed ledger prior to the terminal record has not been tampered.

(6) In one embodiment, the controller obtains the second time stamp token in accordance with an operation by a user onto the data management apparatus.

According to the configuration, the user can obtain the second time stamp token and have the second time stamp token stored in the second distributed ledger at any timing.

(7) In one embodiment, the controller obtains the second time stamp token as a prescribed time period elapses from a time point of previous obtainment of the second time stamp token.

According to the configuration, each time a prescribed time period elapses, the second time stamp token can automatically be obtained and stored in the second distributed ledger.

(8) In one embodiment, the communication apparatus is further configured to communicate with an external server different from the data management apparatus.

The controller transmits to the external server through the communication apparatus, information on a terminal record in the second distributed ledger at a prescribed time point.

According to the configuration, information on the terminal record in the second distributed ledger is separated from the data management apparatus and managed also in the external server. In order to tamper the time stamp token (the first time stamp token and/or the second time stamp token) managed in the second distributed ledger, both of the time stamp token managed in the data management apparatus and information on the terminal record managed in the external server should be tampered. Tamper resistance of the time stamp token can thus be enhanced.

(9) In one embodiment, the information on the terminal record in the second distributed ledger is a hash value of the terminal record.

According to the configuration, the time stamp token is obtained for the hash value of the terminal record stored in the second distributed ledger. In other words, since the record itself stored in the second distributed ledger is not sent to the time stamp authority, the record itself can be concealed at the time when the time stamp token is obtained.

(10) A data management method according to another aspect of the present disclosure is a data management method by using a data management apparatus that manages data based on a distributed ledger technology. The data management apparatus includes a storage device where a distributed ledger is stored, a controller that updates the distributed ledger, and a communication apparatus configured to communicate with a time stamp authority that provides a time stamp token. The distributed ledger includes a first distributed ledger where a record including information on the data is stored in a time-series manner and a second distributed ledger where a record including the time stamp token obtained from the time stamp authority is stored in a time-series manner. The data management method includes obtaining from the time stamp authority through the communication apparatus, a first time stamp token which is a time stamp token for information on a terminal record in the first distributed ledger and storing a record including the first time stamp token in the second distributed ledger.

(11) In one embodiment, obtaining from the time stamp authority through the communication apparatus, a second time stamp token which is a time stamp token for information on a terminal record in the second distributed ledger and storing a record including the second time stamp token in the second distributed ledger are further included.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 2 is a diagram showing an exemplary configuration of a distributed ledger set.

FIG. 4 is a functional block diagram of a controller for performing processing for responding to a first operation.

FIG. 7 is a functional block diagram of the controller for performing processing for responding to a fourth operation.

FIG. 15 is a diagram showing an exemplary configuration of a ledger set.

FIG. 16 is a diagram for illustrating an exemplary configuration of a suspension table.

FIG. 17 is a diagram for illustrating an exemplary configuration of a commit table.

DESCRIPTION OF THE PREFERRED EMBODIMENTS

Figure 1:
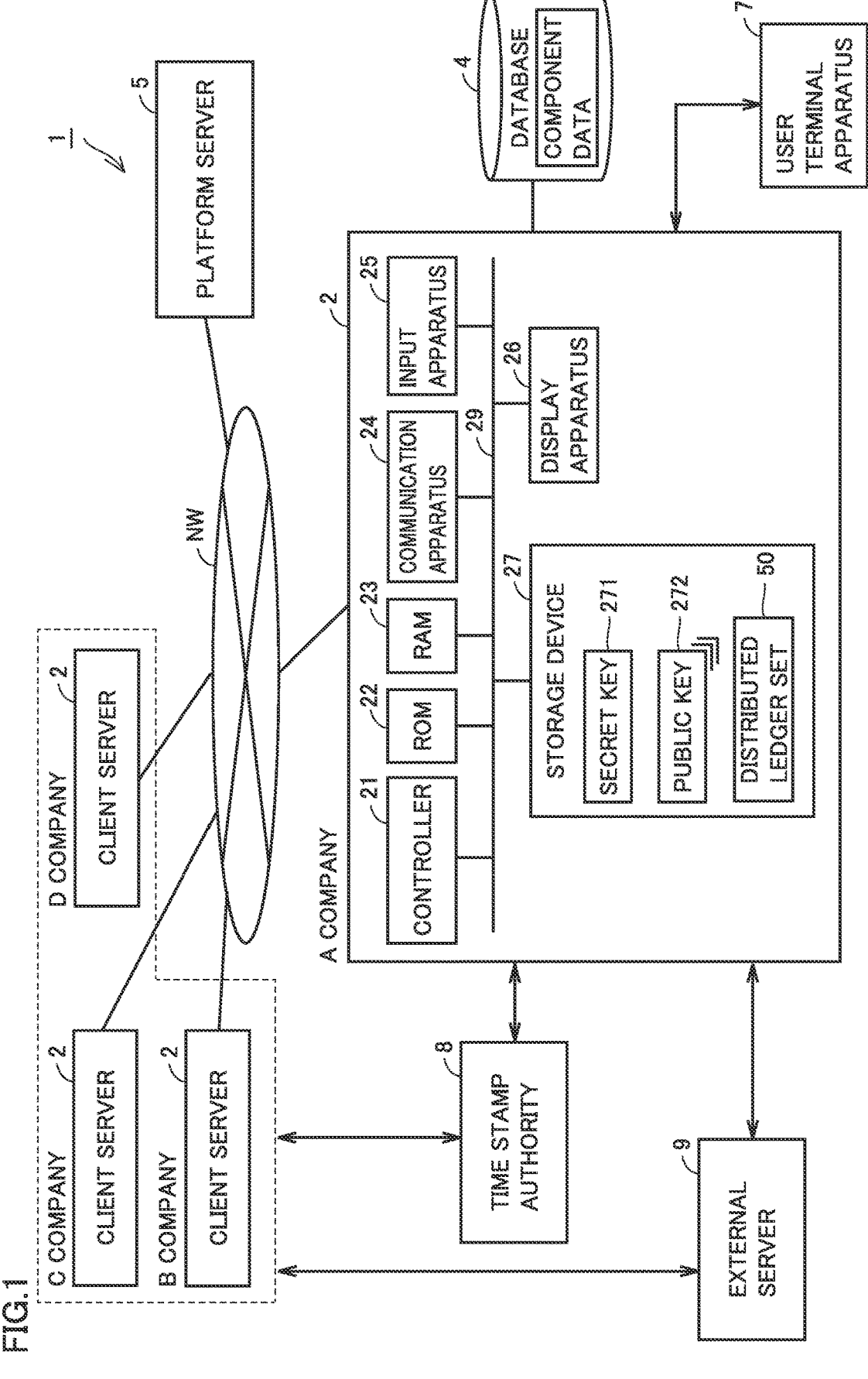
FIG. 1 is a diagram showing a schematic configuration of a data management system according to a first embodiment.

An embodiment of the present disclosure will be described in detail below with reference to the drawings. The same or corresponding elements in the drawings have the same reference characters allotted and description thereof will not be repeated.

First Embodiment

<Overall Configuration of Data Management System>

FIG. 1 is a diagram showing a schematic configuration of a data management system 1 according to a first embodiment. Data management system 1 according to the first embodiment is a system that forms a consortium network (which will also simply be referred to as a "network" below) NW among a plurality of companies and manages data based on a distributed ledger technology. Data management system 1 according to the first embodiment manages data on components (which will also simply be referred to as "component data" below) that compose a vehicle. The component data may be, for example, a specification of a component. Data managed by data management system 1 is not limited to data on components that compose a vehicle but various types of data may be applicable.

Referring to FIG. 1, data management system 1 includes four client servers 2, a platform server 5, a time stamp authority (TSA) 8, and an external server 9. Four client servers 2 belong to different companies (for example, an A company, a B company, a C company, and a D company).

Platform server 5 manages network NW. Platform server 5 accepts an application for participation in network NW from each client server 2. Platform server 5 permits participation of client server 2 into network NW based on an operation to permit participation performed by a manager of platform server 5 or based on a result of determination as to a prescribed condition. In the first embodiment, participation into network NW, of four client servers 2 belonging to the A company, the B company, the C company, and the D company, respectively, is permitted.

Four client servers 2 form network NW, and a hash value of component data is stored in a distributed ledger of each of them. Software based on the distributed ledger has been introduced in each of client servers 2, and as the introduced software based on the distributed ledger functions, each of client servers 2 functions as a node. Though client server 2 of the A company will representatively be described below, client servers 2 of the B company, the C company, and the D company are also similar in configuration and function. Client server 2 corresponds to an exemplary "data management apparatus" according to the present disclosure. Though an example where four client servers are included in network NW in data management system 1 according to the first embodiment is described, any number of client servers 2 such as less than four client servers or five or more client servers may be included in network NW.

Client server 2 is configured to communicate with a user terminal apparatus 7. User terminal apparatus 7 is, for example, a desk-top personal computer (PC), a notebook PC, a tablet terminal, a smartphone, or another information processing terminal with a communication function lent to an employee of the A company.

A database 4 is connected to client server 2. Component data is stored in database 4. Component data is registered or updated in database 4 in accordance with a control signal from client server 2. For example, a user (for example, the employee of the A company) of client server 2 can request update of component data by performing an operation onto an input apparatus 25 (which will be described later) of client server 2 or by performing an operation onto user terminal apparatus 7. Client server 2 (a controller 21) generates a control signal for storing (registering/updating) component data in response to an input to input apparatus 25 or a request from user terminal apparatus 7 and outputs the control signal to database 4.

As client server 2 has component data stored (registered/updated) in database 4, it generates a hash value of the component data and generates transaction data for storing the hash value in the distributed ledger. Then, client server 2 transmits the generated transaction data to another client server 2 that forms network NW, that is, client servers 2 of the B company, the C company, and the D company. In the distributed ledger, a hash value of the component data is stored in a time-series manner, and the distributed ledger forms a proof chain for proving existence of the component data.

Time stamp authority 8 includes a server belonging to an authentication organization that issues a time stamp token. The time stamp authority issues a time stamp token in response to a time stamp issuance request from an applicant (client server 2 in the first embodiment). More specifically, the time stamp authority transmits to the applicant, a time stamp token in which data (a record hash value which will be described later in the first embodiment) received from the applicant is linked to time information based on a time source with followability to international standard time.

External server 9 is a server managed by a management entity which is none of the A company, the B company, the C company, and the D company. External server 9 is configured to communicate with client server 2. External server 9 receives a client certificate which will be described later from client server 2 and manages the received client certificate.

Client server 2 includes controller 21, a read only memory (ROM) 22, a random access memory (RAM) 23, a communication apparatus 24, an input apparatus 25, a display apparatus 26, and a storage device 27. Controller 21, ROM 22, RAM 23, communication apparatus 24, input apparatus 25, display apparatus 26, and storage device 27 are connected to a bus 29.

Controller 21 is implemented, for example, by an integrated circuit including a central processing unit (CPU). Controller 21 develops various programs stored in ROM 22 on RAM 23 and executes the programs. The various programs include an operating system and the like. RAM 23 functions as a working memory, and various types of data necessary for execution of various programs are temporarily stored therein. Though detailed description will be given later, controller 21 performs functions to update component data recorded in database 4, to generate transaction data for updating a distributed ledger, and to obtain a time stamp token.

Communication apparatus 24 is configured to communicate with external equipment. The external equipment includes, for example, another client server 2, user terminal apparatus 7, time stamp authority 8, external server 9, and the like. Communication between communication apparatus 24 and the external equipment is established over the Internet, a wide area network (WAN), a local area network (LAN), an Ethernet® network, a public network, a private network, a wired network or a wireless network, or the like, or combination thereof.

Input apparatus 25 includes an input device. The input device is implemented, for example, by a mouse, a keyboard, a touch panel, and/or another apparatus capable of accepting an operation by a user.

Display apparatus 26 includes a display. Display apparatus 26 has a display show various images in accordance with a control signal from controller 21. The display is implemented, for example, by a liquid crystal display, an organic electro luminescence (EL) display, or other display equipment.

Storage device 27 includes, for example, a storage medium such as a hard disk or a flash memory. A secret key 271, a plurality of public keys 272, and a distributed ledger set 50 are stored in storage device 27.

Secret key 271 is a secret key of the A company. For example, in participation of client server 2 into network NW for the first time, controller 21 generates a secret key and a public key. Then, controller 21 transmits the generated public key to an authentication bureau (not shown) to have the public key authenticated. The authentication bureau is an authentication organization that issues an electronic certificate. The authentication bureau issues an electronic certificate including information on the public key. Controller 21 has secret key 271 corresponding to the authenticated public key stored in storage device 27. Controller 21 transmits authenticated public key (electronic certificate) 272 to client servers 2 of the B company, the C company, and the D company.

The plurality of public keys 272 include the public key of the B company, the public key of the C company, and the public key of the D company. Controller 21 has the public keys received from other client servers 2 stored in storage device 27. The public key of the A company itself may be stored in storage device 27.

Distributed ledger set 50 includes a plurality of distributed ledgers. FIG. 2 is a diagram showing an exemplary configuration of distributed ledger set 50. In the first embodiment, an example in which one component that composes the vehicle is managed by data management system 1 will be described. A component the data of which is managed with the use of the distributed ledger will also be referred to as a "target component" below. Component data of the target component will also be referred to as "target data."

Distributed ledger set 50 includes two distributed ledgers 51 and 52. Distributed ledger 51 functions as a proof chain (which will also be referred to as a "first proof chain" below) of target data, where a state of update of the target data is stored in a time-series manner. Distributed ledger 52 functions as a proof chain (which will also be referred to as a "second proof chain" below) of a time stamp token, where a time stamp token is stored in a time-series manner.

A record including a hash value of the target data is stored in a time-series manner in distributed ledger 51. The record includes such information as "Key", "Age", "Obj-HV", "Nonce", "Sig", "Prev-HV", and "HV".

Key represents information indicating an ID of the target component. An ID k1 is allocated to the target component. Key can also be defined as an ID for identifying distributed ledger 51 or 52. A record including Key set to k1 is stored in a time-series manner in distributed ledger 51 and a record including Key set to k2 is stored in a time-series manner in distributed ledger 52.

Age represents information indicating a generation of a record. In the first record of the target component stored in distributed ledger 51, Age is set to 0. As the target component is updated and a record is added, Age is incremented.

Obj-HV represents a hash value of the target data. For example, as the target data stored in database 4 is updated, the hash value of the updated target data is generated and defined as Obj-HV. The hash value is a numeric value obtained as a result of hashing of the target data with a hash function.

Nonce represents a nonce value indicating a number of transaction data. Specifically, the nonce value is generated by client server 2 (controller 21), for example, at the time of update of the target data stored in database 4, as a number of processing for storing a hash value of the updated target data in distributed ledger 51. The nonce value refers to a hash value that is less likely to cryptographically cause collision.

Sig represents an electronic signature created with secret key 271 of client server 2 that has issued transaction data. The electronic signature is created, for example, by encrypting Obj-HV (that is, the hash value of the target data) with secret key 271. Alternatively, the electronic signature may be created, for example, by encryption of Nonce (nonce value) with secret key 271.

Prev-HV represents a hash value of a record (a parent record) in a generation immediately preceding the latest (terminal) record. In other words, Prev-HV represents HV of the parent record.

HV represents a hash value of a record. Specifically, HV represents a hash value (which will also be referred to as a "record hash value" below) of information (Key, Age, Obj-HV, Nonce, Sig, and Prev-HV) on a record except for HV.

For example, as shown in FIG. 2, with attention being paid to the latest (terminal) record (a record of Age "2") in distributed ledger 51, Prev-HV of the terminal record is set to "H2" which is HV of the parent record (Age "1"). Then, when the component data of the first component is updated and a record of Age "3" is added, Prev-HV of the record of Age "3" is set to "H3" which is HV of the record of Age "2". The terminal record thus has such a structure as including a record hash value of the parent record. In other words, a chain of records is realized between Prev-HV of the terminal record and HV of the parent record. Distributed ledger 51 is thus in a directed acyclic graph (DAG) structure.

A record including a time stamp token is stored in a time-series manner in distributed ledger 52. The record includes such information as "Key", "Age", "Obj-HV", "Nonce", "Sig", "Prev-HV", and "HV". Since details of such information as "Age", "Nonce", "Sig", "Prev-HV", and "HV" are similar to those of the record in distributed ledger 51, description will not be repeated.

Key represents information indicating an ID of a time stamp token obtained from time stamp authority 8. An ID k2 is allocated to the time stamp token.

Obj-HV represents a value of a time stamp token. As will be described later, a time stamp token obtained for a record hash value in distributed ledger 51 or a time stamp token obtained for a record hash value in distributed ledger 52 is stored as Obj-HV.

Controller 21 of client server 2 performs a function to respond to first to fourth operations which will be described below.

<First Operation>

Referring to FIGS. 1 and 2, for example, a user of client server 2 can perform onto input apparatus 25 or user terminal apparatus 7, an operation to register target data in database 4 or an operation to update target data registered in database 4. The operation to register the target data and the operation to update the target data will also collectively be referred to as a "first operation" below.

As the first operation is performed, in response to the first operation, input apparatus 25 or user terminal apparatus 7 outputs a first request indicating that the first operation has been performed. In response to the first request, client server 2 (controller 21) has the target data registered in database 4 or updates the target data stored in database 4. Then, client server 2 (controller 21) generates transaction data for adding the record including the hash value of the registered or updated target data to distributed ledger 51. This transaction data includes such information as "Key", "Age", "Obj-HV", "Nonce", "Sig", "Prev-HV", and "HV".

The transaction data may further include time information on time at which transaction data is broadcast toward network NW (transmitted to network NW) and sender information on a sender of the transaction data. The time information may be, for example, information indicating time at which target data is recorded in database 4. The sender information is, for example, information indicating the A company. The sender information of the transaction data may be further specific, and it may be information indicating a department (one department of the A company) that has performed an operation to transmit transaction data to network NW or information indicating an individual (an employee of the A company) who has performed the operation to transmit transaction data to network NW.

As this transaction data is processed, a record including a hash value of the registered or updated target data is added to distributed ledger 51.

<Second Operation>

The user of client server 2 can perform an operation to obtain a time stamp token for a terminal record in distributed ledger 51 (which will also be referred to as a "second operation" below) onto input apparatus 25 or user terminal apparatus 7.

As the second operation is performed, in response to the second operation, input apparatus 25 or user terminal apparatus 7 outputs a second request indicating that the second operation has been performed. In response to the second request, client server 2 (controller 21) generates a record hash value of the terminal record in distributed ledger 51 and obtains a time stamp token for the record hash value. Then, client server 2 (controller 21) generates transaction data for adding a record including the time stamp token to distributed ledger 52. This transaction data includes such information as "Key", "Age", "Obj-HV", "Nonce", "Sig", "Prev-HV", and "HV". The transaction data may include time information and sender information. As this transaction data is processed, the record including the time stamp token obtained for the record hash value of the terminal record in distributed ledger 51 is added to distributed ledger 52.

Client server 2 (controller 21) may be configured to automatically perform processing for responding to the second request when it senses addition of a new record to distributed ledger 51. In other words, when client server 2 (controller 21) senses addition of a new record to distributed ledger 51, it generates a record hash value of the record and obtains a time stamp token for the record hash value. Then, client server 2 (controller 21) generates transaction data for adding the record including the time stamp token to distributed ledger 52.

<Third Operation>

Furthermore, the user of client server 2 can perform an operation to obtain a time stamp token for a terminal record in distributed ledger 52 (which will also be referred to as a "third operation" below) onto input apparatus 25 or user terminal apparatus 7.

As the third operation is performed, in response to the third operation, input apparatus 25 or user terminal apparatus 7 outputs a third request indicating that the third operation has been performed. In response to the third request, client server 2 (controller 21) generates a record hash value of a terminal record in distributed ledger 52 and obtains a time stamp token for that record hash value. Then, client server 2 (controller 21) generates transaction data for adding a record including the time stamp token to distributed ledger 52. This transaction data includes such information as "Key", "Age", "Obj-HV", "Nonce", "Sig", "Prev-HV", and "HV". The transaction data may include time information and sender information.

<Fourth Operation>

Furthermore, the user of client server 2 can perform an operation to generate a client certificate (which will also be referred to as a "fourth operation" below) onto input apparatus 25 or user terminal apparatus 7. The client certificate refers to data including a record hash value of a terminal record in distributed ledger 52 at a time point when the fourth operation is performed.

As the fourth operation is performed, in response to the fourth operation, input apparatus 25 or user terminal apparatus 7 outputs a fourth request indicating that the fourth operation has been performed. In response to the fourth request, client server 2 (controller 21) generates a record hash value of a terminal record in distributed ledger 52 and creates a client certificate including the record hash value. Then, client server 2 (controller 21) transmits the client certificate to external server 9 through communication apparatus 24.

<Update of Distributed Ledger Set>

Figure 3:
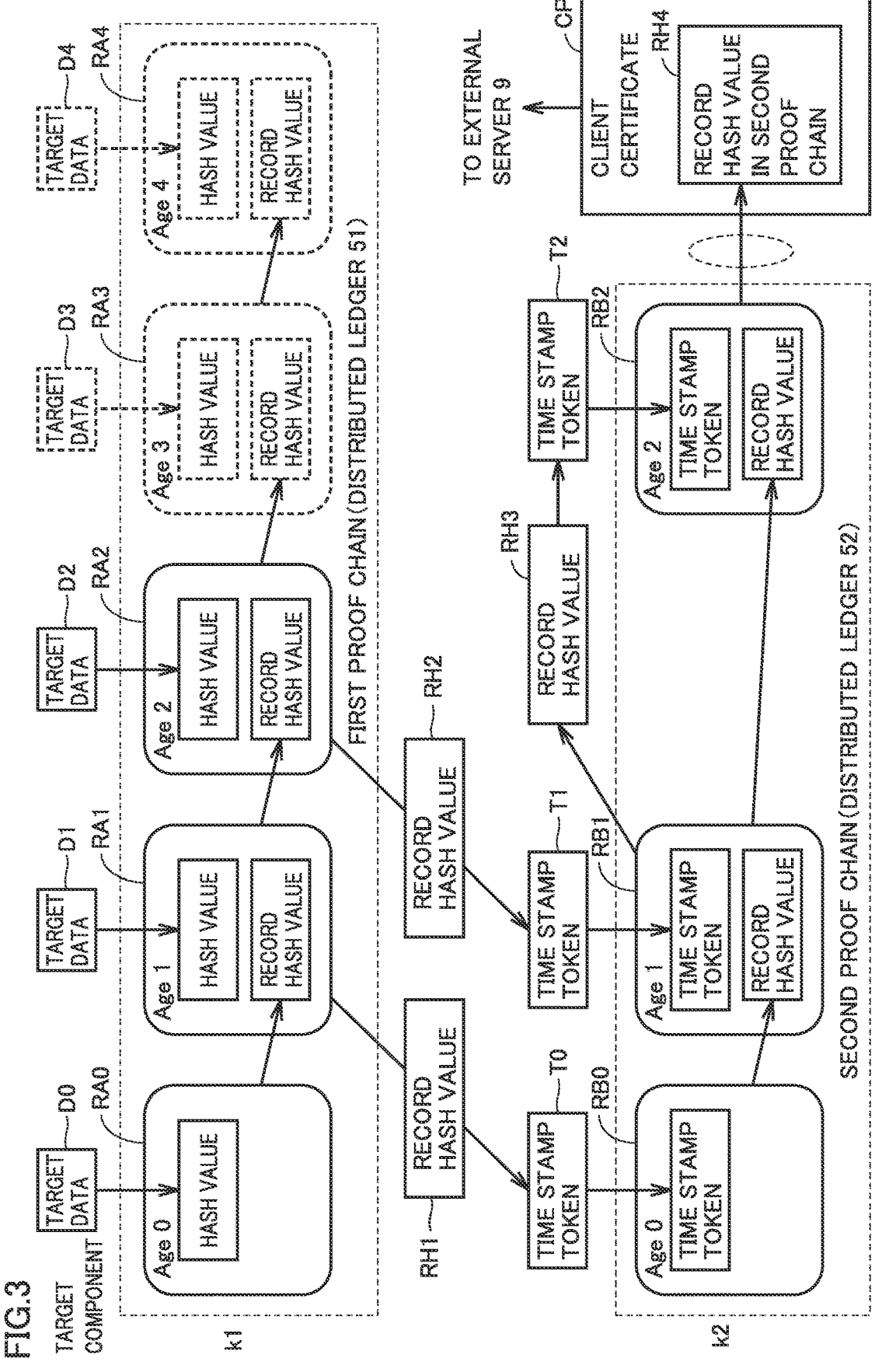
FIG. 3 is a diagram for illustrating update of a distributed ledger set.

FIG. 3 is a diagram for illustrating update of distributed ledger set 50. An upper tier in FIG. 3 schematically shows distributed ledger 51 which is the first proof chain and a lower tier in FIG. 3 schematically shows distributed ledger 52 which is the second proof chain.

The hash value of the component data of the target component (target data) is stored in a time-series manner in the first proof chain (distributed ledger 51). As target data D0 is first registered in database 4 by an operation to register target data (the first operation), a record RA0 of Age "0" including the hash value of that target data D0 is stored in distributed ledger 51. Then, as the target data is updated by the operation to update the target data (the first operation) and updated target data D1 is registered in database 4, a record RA1 of Age "1" including the hash value of updated target data D1 and the record hash value of parent record RA0 of Age "0" is stored in distributed ledger 51. As the target data is further updated by the operation (first operation) to update target data and updated target data D2 is registered in database 4, a record RA2 of Age "2" including the hash value of updated target data D2 and the record hash value of parent record RA1 of Age "1" is stored in distributed ledger 51. Similarly, each time the target data is updated to D3 and D4, records RA3 and RA4 including respective hash values of target data D3 and D4 are stored in distributed ledger 51.

The time stamp token is stored in a time-series manner in the second proof chain (distributed ledger 52). A scene in which distributed ledger 51 is updated for the first time, record RA1 is added to distributed ledger 51, and record RA1 is the terminal record in distributed ledger 51 is assumed. As the second operation is performed in this scene, a record hash value RH1 of record RA1 is generated. Then, a time stamp token T0 for record hash value RH1 is obtained and a record RB0 of Age "0" including time stamp token T0 is stored in distributed ledger 52. Then, a scene in which distributed ledger 51 is updated and a record RA2 is added to distributed ledger 51 is assumed. As the second operation is performed in this scene, a record hash value RH2 of record RA2 is generated. Then, a time stamp token T1 for record hash value RH2 is obtained, and a record RB1 of Age "1" including time stamp token T1 and the record hash value of parent record RB0 of Age "0" is stored in distributed ledger 52. As described above, when a record is added to distributed ledger 51, the time stamp token for the record hash value of the record may automatically be obtained.

The user can perform the second operation at any timing. Specifically, though an example in which the second operation is performed each time a record is added to distributed ledger 51 is shown above, the second operation does not have to be performed each time a record is added to distributed ledger 51. For example, the second operation may be performed every prescribed times of addition of a record to distributed ledger 51, or may be performed after lapse of a first prescribed time period since the second operation was performed previously. The first prescribed time period may be set, for example, in consideration of an expiration date of the time stamp token.

A scene in which record RB1 is the terminal record in distributed ledger 52 is assumed. When the third operation (the operation to obtain the time stamp token for the terminal record in distributed ledger 52) is performed on input apparatus 25 or user terminal apparatus 7 in this scene, a record hash value RH3 of terminal record RB1 in distributed ledger 52 is generated. Then, a time stamp token T2 for record hash value RH3 is obtained, and a record RB2 of Age "2" including time stamp token T2 and the record hash value of parent record RB1 is stored in distributed ledger 52. The third operation can be performed at any timing of the user. Regardless of the third operation, the time stamp token for the record hash value of the terminal record in distributed ledger 52 may be obtained when a second prescribed time period has elapsed since previous addition of a record to distributed ledger 52. The second prescribed time period may be set, for example, in consideration of an expiration date of the time stamp token. The second prescribed time period may be set to a time period the same as or different from the first prescribed time period described above.

Then, a scene in which record RB2 is the terminal record in distributed ledger 52 is assumed. When the fourth operation (the operation to create the client certificate) is performed onto input apparatus 25 or user terminal apparatus 7 in this scene, a record hash value RH4 of terminal record RB2 in distributed ledger 52 is generated. Then, a client certificate CP including record hash value RH4 is created. This client certificate CP is managed as being separated from client server 2. For example, client certificate CP is sent to external server 9 through communication apparatus 24.

The fourth operation can be performed at any timing. For example, when the fourth operation is performed in the scene where record RB1 is the terminal record in distributed ledger 52, a client certificate including a record hash value of terminal record RB1 in distributed ledger 52 is created. This client certificate may be sent to external server 9 through communication apparatus 24.

Each time target data is updated as above, a record including a hash value thereof is stored in distributed ledger 51. As the hash value of the target data is managed by means of distributed ledger 51, tamper resistance of the target data can be enhanced.

In general, an expiration date is set for the time stamp token. Existence and integrity of the target data (hash value) cannot be proven with an expired time stamp token. Then, a time stamp token obtained for a terminal record in distributed ledger 51 is stored in distributed ledger 52 as above. In distributed ledger 52, records are chained with a record hash value of a parent record being included. Therefore, in order to tamper the expired time stamp token, all time stamp tokens added to distributed ledger 52 after storage of the expired time stamp token should be tampered. As the time stamp token is thus stored in distributed ledger 52, tamper resistance of the time stamp token can be enhanced. For example, even when time stamp token T0 stored in record RB0 expires, subsequent records RB1 and RB2 can prove the fact that time stamp token T0 has not been tampered. Since validity of time stamp token T0 can thus be proven, the expiration date of time stamp token T0 can substantially be extended. In other words, existence and integrity of target data D1 can be proven with the use of time stamp token T0.

Furthermore, a time stamp token T2 is obtained for record hash value RH3 of terminal record RB1 in distributed ledger 52 at any timing. By obtaining time stamp token T2 for record hash value RH3 in distributed ledger 52, existence of record RB1 at time proven by time stamp token T2 and the fact that record RB1 has not been tampered after the time proven by time stamp token T2 can be proven. Existence of record RB1 at the time proven by time stamp token T2 and the fact that a series of time stamp tokens stored in distributed ledger 52 has not been tampered can thus be proven.

Furthermore, by storing record RB2 including time stamp token T2 obtained for record hash value RH3 and the record hash value of parent record RB1 in distributed ledger 52, tamper resistance of a time stamp token T3 can be enhanced.

Client certificate CP is separated from client server 2 and managed in external server 9. Thus, even when all records in distributed ledger set 50 are tampered, client certificate CP managed in external server 9 can prove that distributed ledger set 50 has been tampered.

The first operation, the second operation, the third operation, and the fourth operation may be operations, for example, performed by the user to select respective request buttons (a first button, a second button, a third button, and a fourth button) shown on the display screen of display apparatus 26 or user terminal apparatus 7.

<Functional Block>

Figure 4:
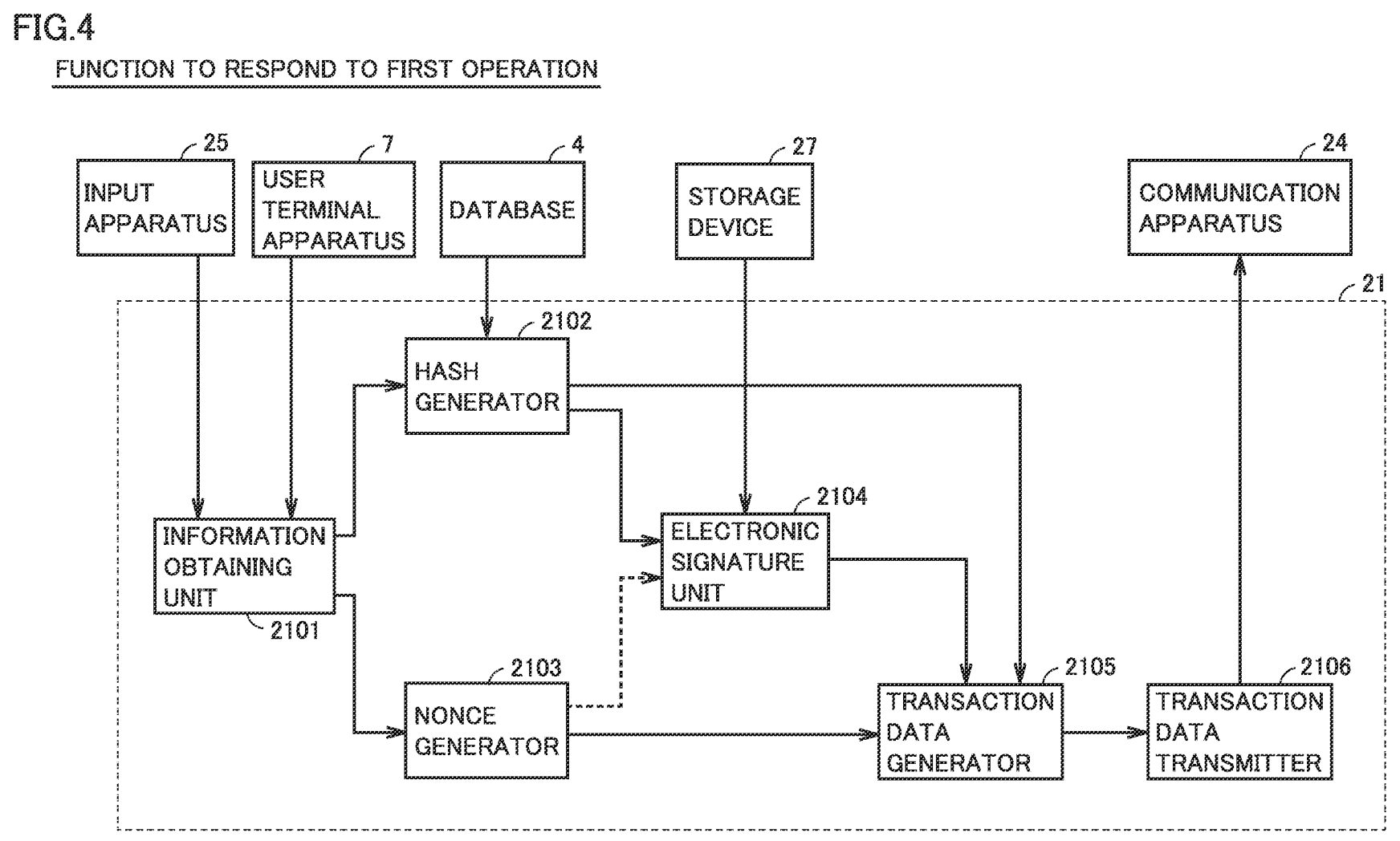

FIG. 4 is a functional block diagram of controller 21 for performing processing for responding to the first operation. Referring to FIG. 4, controller 21 includes an information obtaining unit 2101, a hash generator 2102, a nonce generator 2103, an electronic signature unit 2104, a transaction data generator 2105, and a transaction data transmitter 2106. Controller 21 functions as information obtaining unit 2101, hash generator 2102, nonce generator 2103, electronic signature unit 2104, transaction data generator 2105, and transaction data transmitter 2106, for example, by executing a program stored in ROM 22. Information obtaining unit 2101, hash generator 2102, nonce generator 2103, electronic signature unit 2104, transaction data generator 2105, and transaction data transmitter 2106 may be implemented, for example, by dedicated hardware (electronic circuitry).

As the first operation to register or update the target data is performed on input apparatus 25 or user terminal apparatus 7, input apparatus 25 or user terminal apparatus 7 outputs the first request indicating that the first operation has been performed.

Information obtaining unit 2101 obtains the first request from input apparatus 25 or user terminal apparatus 7. For example, when a user of client server 2 performs the first operation on input apparatus 25, the first request is inputted to information obtaining unit 2101. The first request includes ID (Key) information M1 for identifying distributed ledger 51 to which a record is to be added. As information obtaining unit 2101 obtains the first request, it outputs the first request to hash generator 2102 and nonce generator 2103.

As hash generator 2102 receives the first request, for example, it reads the target data from database 4 and generates the hash value of the target data. Hash generator 2102 outputs the generated hash value and ID information M1 to electronic signature unit 2104 and transaction data generator 2105.

As nonce generator 2103 receives the first request, it generates a nonce value. The nonce value refers to a hash value that is less likely to cryptographically cause collision. Nonce generator 2103 outputs the generated nonce value and ID information M1 to transaction data generator 2105. When the nonce value is used for creation of the electronic signature, nonce generator 2103 may output the nonce value and ID information M1 to electronic signature unit 2104.

Electronic signature unit 2104 reads secret key 271 from storage device 27. Electronic signature unit 2104 creates the electronic signature by encrypting with secret key 271, the hash value received from hash generator 2102. Electronic signature unit 2104 outputs the created electronic signature and ID information M1 to transaction data generator 2105.

Alternatively, electronic signature unit 2104 may create the electronic signature by encrypting with secret key 271, the nonce value received from nonce generator 2103. Alternatively, electronic signature unit 2104 may create the electronic signature by encrypting the hash value and the nonce value with secret key 271.

Transaction data generator 2105 generates transaction data to be transmitted to network NW. For example, transaction data generator 2105 generates transaction data including such information as Key, Age, Obj-HV, Nonce, Sig, Prev-HV, and HV. Transaction data generator 2105 recognizes Age of the parent record, for example, by checking ID information M1 (Key) against distributed ledger set 50, increments Age of the parent record, and sets incremented Age as Age of the record to be added. Transaction data generator 2105 sets the hash value generated by hash generator 2102 as Obj-HV, sets the nonce value generated by nonce generator 2103 as Nonce, and sets the electronic signature created by electronic signature unit 2104 as Sig. Transaction data generator 2105 sets the record hash value of the parent record as Prev-HV. Transaction data generator 2105 hashes such information as Key, Age, Obj-HV, Nonce, Sig, and Prev-HV, and sets the information as HV. The transaction data may further include time information on time at which the transaction data is broadcast toward network NW (transmitted to network NW) and sender information on a sender of the transaction data. Transaction data generator 2105 outputs the generated transaction data to transaction data transmitter 2106.

Transaction data transmitter 2106 outputs to communication apparatus 24, a control signal for transmitting transaction data to network NW. The transaction data is thus transmitted to network NW through communication apparatus 24.

Figure 5:
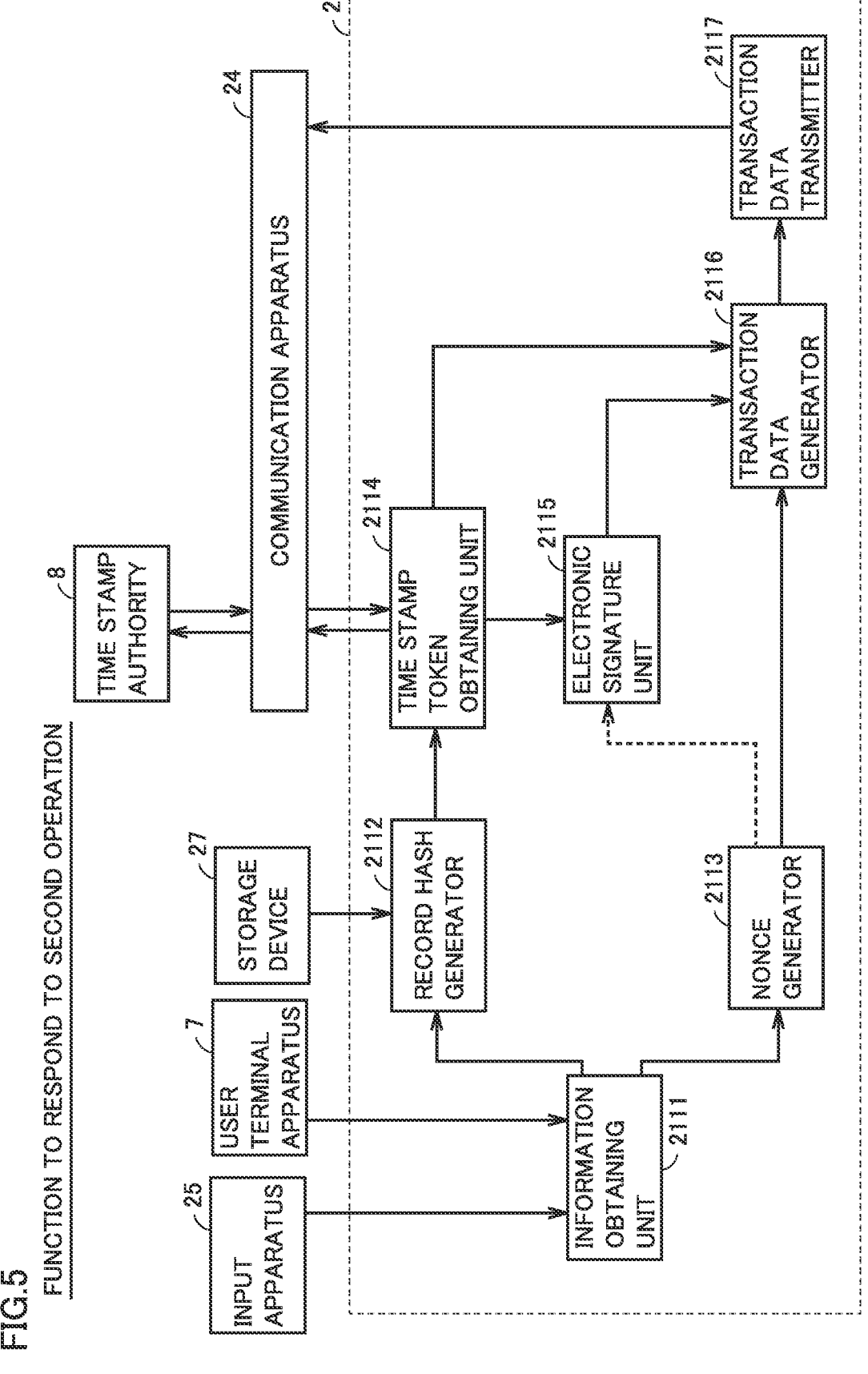
FIG. 5 is a functional block diagram of the controller for performing processing for responding to a second operation.

FIG. 5 is a functional block diagram of controller 21 for performing processing for responding to the second operation. Referring to FIG. 5, controller 21 includes an information obtaining unit 2111, a record hash generator 2112, a nonce generator 2113, a time stamp token obtaining unit 2114, an electronic signature unit 2115, a transaction data generator 2116, and a transaction data transmitter 2117. Controller 21 functions as information obtaining unit 2111, record hash generator 2112, nonce generator 2113, time stamp token obtaining unit 2114, electronic signature unit 2115, transaction data generator 2116, and transaction data transmitter 2117, for example, by executing a program stored in ROM 22. Information obtaining unit 2111, record hash generator 2112, nonce generator 2113, time stamp token obtaining unit 2114, electronic signature unit 2115, transaction data generator 2116, and transaction data transmitter 2117 may be implemented, for example, by dedicated hardware (electronic circuitry).

As the second operation to obtain the time stamp token for the terminal record in distributed ledger 51 is performed on input apparatus 25 or user terminal apparatus 7, input apparatus 25 or user terminal apparatus 7 outputs the second request indicating that the second operation has been performed.

Information obtaining unit 2111 obtains the second request from input apparatus 25 or user terminal apparatus 7. For example, as the user of client server 2 performs the second operation onto input apparatus 25, the second request is inputted to information obtaining unit 2111. The second request includes ID information M2 for identifying distributed ledger 51 for which the time stamp token is to be obtained and ID information M3 for identifying distributed ledger 52 to which a record is to be added. As information obtaining unit 2111 obtains the second request, it outputs the second request to record hash generator 2112 and nonce generator 2113.

Information obtaining unit 2111 may monitor a state of update of distributed ledger 51 and may determine that it has obtained the second request based on addition of a record to distributed ledger 51 in response to the first operation.

When record hash generator 2112 receives the second request, it generates the record hash value of the latest (terminal) record in distributed ledger 51 identified by ID information M2. Record hash generator 2112 outputs the generated record hash value and ID information M3 to time stamp token obtaining unit 2114.

As nonce generator 2113 receives the second request, it generates the nonce value. Nonce generator 2113 outputs to transaction data generator 2116, the generated nonce value and ID information M3. When the nonce value is used for creation of the electronic signature, nonce generator 2113 may output the nonce value and ID information M3 to electronic signature unit 2115.

Time stamp token obtaining unit 2114 obtains the time stamp token for the record hash value received from record hash generator 2112. Specifically, time stamp token obtaining unit 2114 outputs to communication apparatus 24, a control signal for transmitting the record hash value to time stamp authority 8. The record hash value is thus transmitted to time stamp authority 8 through communication apparatus 24. Time stamp authority 8 that has received the record hash value sends the time stamp token back to client server 2 which is the sender of the record hash value. Time stamp token obtaining unit 2114 obtains the time stamp token from time stamp authority 8 through communication apparatus 24. Time stamp token obtaining unit 2114 outputs the time stamp token and ID information M3 for identifying distributed ledger 52 where the time stamp token is to be stored to electronic signature unit 2115 and transaction data generator 2116.

Electronic signature unit 2115 reads secret key 271 from storage device 27. Electronic signature unit 2115 creates the electronic signature by encrypting the time stamp token received from time stamp token obtaining unit 2114 with secret key 271. Electronic signature unit 2115 outputs to transaction data generator 2116, the created electronic signature and ID information M3. Alternatively, electronic signature unit 2115 may create the electronic signature by encrypting the nonce value received from nonce generator 2113 with secret key 271. Alternatively, electronic signature unit 2115 may create the electronic signature by encrypting the time stamp token and the nonce value with secret key 271.

Transaction data generator 2116 generates transaction data to be transmitted to network NW. For example, transaction data generator 2116 generates transaction data including such information as Key, Age, Obj-HV, Nonce, Sig, Prev-HV, and HV. Transaction data generator 2116 sets ID information M3 (k2) as Key. Transaction data generator 2116 sets the time stamp token as Obj-HV. Other functions of transaction data generator 2116 are basically similar to those of transaction data generator 2105 described with reference to FIG. 4.

Transaction data transmitter 2117 outputs to communication apparatus 24, a control signal for transmitting transaction data to network NW. The transaction data is thus transmitted to network NW through communication apparatus 24.

Figure 6:
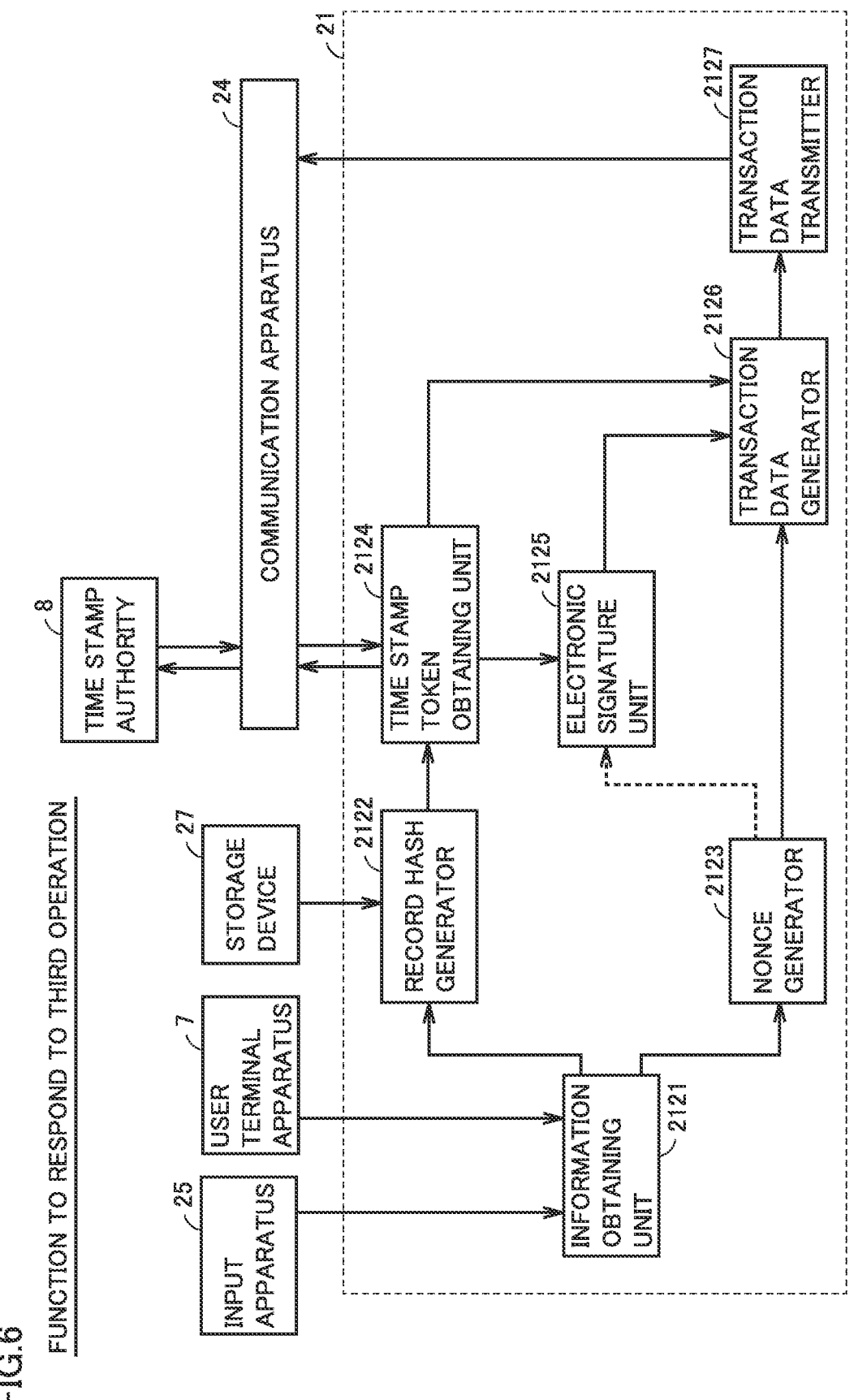
FIG. 6 is a functional block diagram of the controller for performing processing for responding to a third operation.

FIG. 6 is a functional block diagram of controller 21 for performing processing for responding to the third operation.

Referring to FIG. 6, controller 21 includes an information obtaining unit 2121, a record hash generator 2122, a nonce generator 2123, a time stamp token obtaining unit 2124, an electronic signature unit 2125, a transaction data generator 2126, and a transaction data transmitter 2127. Controller 21 functions as information obtaining unit 2121, record hash generator 2122, nonce generator 2123, time stamp token obtaining unit 2124, electronic signature unit 2125, transaction data generator 2126, and transaction data transmitter 2127, for example, by executing a program stored in ROM 22. Information obtaining unit 2121, record hash generator 2122, nonce generator 2123, time stamp token obtaining unit 2124, electronic signature unit 2125, transaction data generator 2126, and transaction data transmitter 2127 may be implemented, for example, by dedicated hardware (electronic circuitry).

As the third operation to obtain a time stamp token for the terminal record in distributed ledger 52 is performed on input apparatus 25 or user terminal apparatus 7, input apparatus 25 or user terminal apparatus 7 outputs the third request indicating that the third operation has been performed.

Information obtaining unit 2121 obtains the third request from input apparatus 25 or user terminal apparatus 7. For example, as the user of client server 2 performs the third operation onto input apparatus 25, the third request is inputted to information obtaining unit 2121. The third request includes ID information M4 for identifying distributed ledger 52 for which the time stamp token is to be obtained and ID information M5 for identifying distributed ledger 52 where the time stamp token is to be stored. As information obtaining unit 2121 obtains the third request, it outputs the third request to record hash generator 2122 and nonce generator 2123.

When record hash generator 2122 receives the third request, it generates the record hash value of the latest (terminal) record in distributed ledger 52 identified by ID information M4. Record hash generator 2122 outputs the generated record hash value and ID information M5 to time stamp token obtaining unit 2124.

When nonce generator 2123 receives the third request, it generates the nonce value. Nonce generator 2123 outputs the generated nonce value and ID information M5 to transaction data generator 2126. When the nonce value is used for creation of an electronic signature, nonce generator 2123 may output the nonce value and ID information M5 to electronic signature unit 2125.

Time stamp token obtaining unit 2124 obtains the time stamp token for the record hash value received from record hash generator 2122. Specifically, time stamp token obtaining unit 2124 outputs to communication apparatus 24, a control signal for transmitting the record hash value to time stamp authority 8. The record hash value is thus transmitted to time stamp authority 8 through communication apparatus 24. Time stamp authority 8 that has received the record hash value sends the time stamp token back to client server 2 which is the sender of the record hash value. Time stamp token obtaining unit 2124 obtains the time stamp token from time stamp authority 8 through communication apparatus 24. Time stamp token obtaining unit 2124 outputs the time stamp token and ID information M5 for identifying distributed ledger 52 where the time stamp token is to be stored to electronic signature unit 2125 and transaction data generator 2126.

Electronic signature unit 2125 reads secret key 271 from storage device 27. Electronic signature unit 2125 creates the electronic signature by encrypting the time stamp token received from time stamp token obtaining unit 2124 with secret key 271. Electronic signature unit 2125 outputs the created electronic signature and ID information M5 to transaction data generator 2126. Alternatively, electronic signature unit 2125 may create the electronic signature by encrypting the nonce value received from nonce generator 2123 with secret key 271. Alternatively, electronic signature unit 2125 may create the electronic signature by encrypting the time stamp token and the nonce value with secret key 271.

Transaction data generator 2126 generates transaction data to be transmitted to network NW. For example, transaction data generator 2126 generates transaction data including such information as Key, Age, Obj-HV, Nonce, Sig, Prev-HV, and HV. Transaction data generator 2126 sets ID information M5 (k2) as Key. Transaction data generator 2126 sets the time stamp token as Obj-HV. Other functions of transaction data generator 2126 are basically similar to those of transaction data generator 2105 described with reference to FIG. 4.

Transaction data transmitter 2127 outputs to communication apparatus 24, a control signal for transmitting transaction data to network NW. The transaction data is thus transmitted to network NW through communication apparatus 24.

Figure 7:
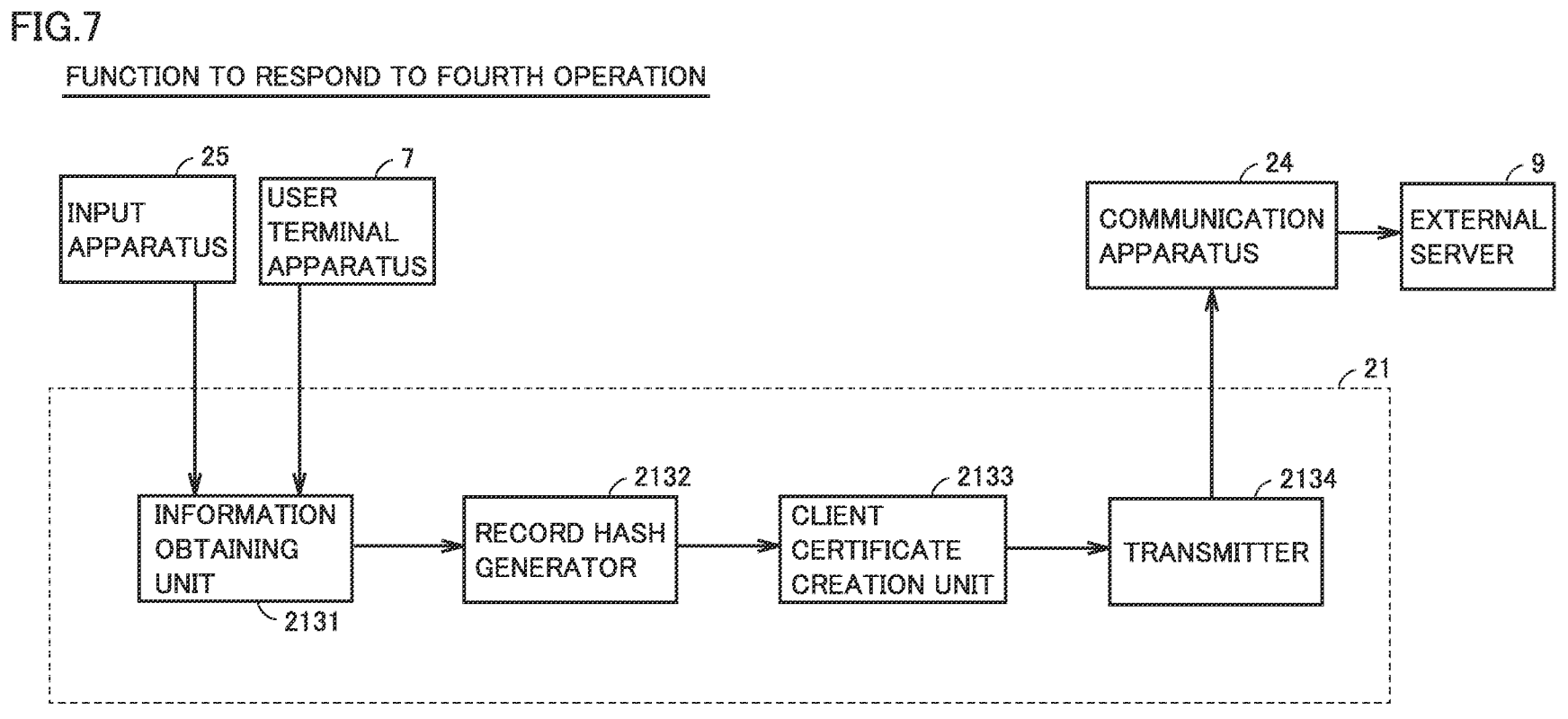

FIG. 7 is a functional block diagram of controller 21 for performing processing for responding to the fourth operation. Referring to FIG. 7, controller 21 includes an information obtaining unit 2131, a record hash generator 2132, a client certificate creation unit 2133, and a transmitter 2134. Controller 21 functions as information obtaining unit 2131, record hash creation unit 2132, client certificate creation unit 2133, and transmitter 2134, for example, by executing a program stored in ROM 22. Information obtaining unit 2131, record hash generator 2132, client certificate creation unit 2133, and transmitter 2134 may be implemented, for example, by dedicated hardware (electronic circuitry).

As the fourth operation for generating the client certificate is performed on input apparatus 25 or user terminal apparatus 7, input apparatus 25 or user terminal apparatus 7 outputs the fourth request indicating that the fourth operation has been performed.

Information obtaining unit 2131 obtains the fourth request from input apparatus 25 or user terminal apparatus 7. For example, when the user of client server 2 performs the fourth operation onto input apparatus 25, the fourth request is inputted to information obtaining unit 2131. The fourth request includes ID information M6 (k2) for identifying distributed ledger 52 for which the record hash value is to be generated. When information obtaining unit 2131 obtains the fourth request, it outputs the fourth request to record hash generator 2132.

Record hash generator 2132 generates the record hash value of the latest (terminal) record in distributed ledger 52 for which the record hash value is to be generated. Record hash generator 2132 outputs the generated record hash value to client certificate creation unit 2133.

Client certificate creation unit 2133 creates the client certificate including the record hash value received from record hash generator 2132. The client certificate may include, for example, information for identifying client server 2 that has created the client certificate. Client certificate creation unit 2133 outputs the created client certificate to transmitter 2134.

Transmitter 2134 outputs to communication apparatus 24, a control signal for transmitting the client certificate to external server 9. The client certificate is thus transmitted to external server 9 through communication apparatus 24.

Figure 8:
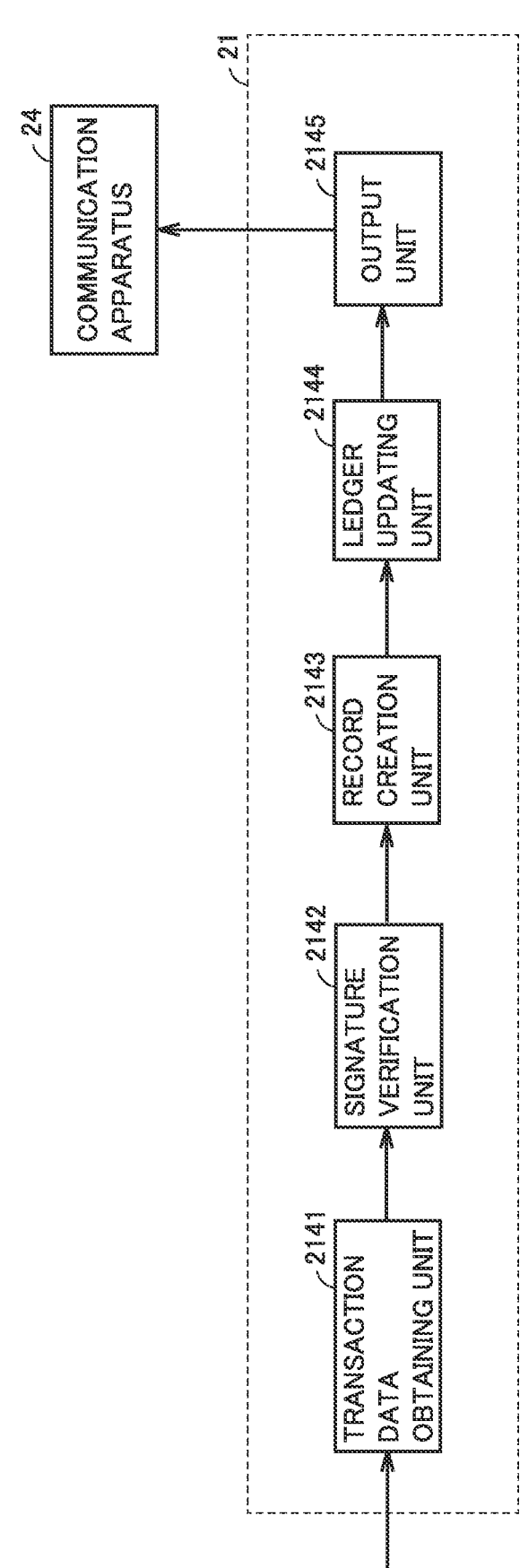
FIG. 8 is a functional block diagram of the controller for executing received transaction data.

FIG. 8 is a functional block diagram of controller 21 for executing received transaction data. Referring to FIG. 8, controller 21 includes a transaction data obtaining unit 2141, a signature verification unit 2142, a record creation unit 2143, a ledger updating unit 2144, and an output unit 2145. Controller 21 functions as transaction data obtaining unit 2141, signature verification unit 2142, record creation unit 2143, ledger updating unit 2144, and output unit 2145, for example, by executing a program stored in ROM 22. Transaction data obtaining unit 2141, signature verification unit 2142, record creation unit 2143, ledger updating unit 2144, and output unit 2145 may be implemented, for example, by dedicated hardware (electronic circuitry).

Transaction data obtaining unit 2141 obtains transaction data transmitted from another client server 2. Transaction data obtaining unit 2141 outputs the obtained transaction data to signature verification unit 2142.

Signature verification unit 2142 verifies validity of the electronic signature (Sig) included in the transaction data. Initially, signature verification unit 2142 identifies client server 2 which is the sender of the transaction data based on sender information included in the transaction data. Then, signature verification unit 2142 reads a public key (one of a plurality of public keys 272) of identified client server 2 from storage device 27. Signature verification unit 2142 decrypts the electronic signature included in the transaction data with the read public key. As described above, the electronic signature is created by encryption of the hash value of the target data or the time stamp token with the secret key of sender client server 2. Signature verification unit 2142 compares the decrypted value with Obj-HV (the hash value or the time stamp token) included in the transaction data. When signature verification unit 2142 confirms match therebetween, it acknowledges validity of the electronic signature.

When validity of the electronic signature is acknowledged, record creation unit 2143 creates a record to be added to distributed ledger set 50 based on the transaction data. Record creation unit 2143 reads such information as Key, Age, Obj-HV, Nonce, Sig, Prev-HV, and HV from the transaction data and creates a record including such information.

Ledger updating unit 2144 adds the record created by record creation unit 2143 to distributed ledger set 50 to update distributed ledger set 50. Specifically, ledger updating unit 2144 refers to Key in the created record and identifies a distributed ledger to which the record is to be added. For example, transaction data generated in accordance with the first operation to register/update the target data described above includes "k1" as Key. Therefore, ledger updating unit 2144 adds the record to distributed ledger 51 which is the proof chain of the target data. The transaction data generated in accordance with the second operation to obtain the time stamp token for the terminal record in distributed ledger 51 and the third operation to obtain the time stamp token for the terminal record in distributed ledger 52 includes "k2" as Key. Therefore, ledger updating unit 2144 adds the record to distributed ledger 52 which is the proof chain of the time stamp token.

As update of distributed ledger set 50 is completed, ledger updating unit 2144 outputs that fact to output unit 2145.

Output unit 2145 outputs to communication apparatus 24, a control signal for transmission of an indication of completion of processing for executing transaction data (transaction processing) to client server 2 which is the sender of the transaction data. A report on completion of transaction processing is thus transmitted through communication apparatus 24 to client server 2 which is the sender of the transaction data.

\<Flowchart\>

Figure 9:
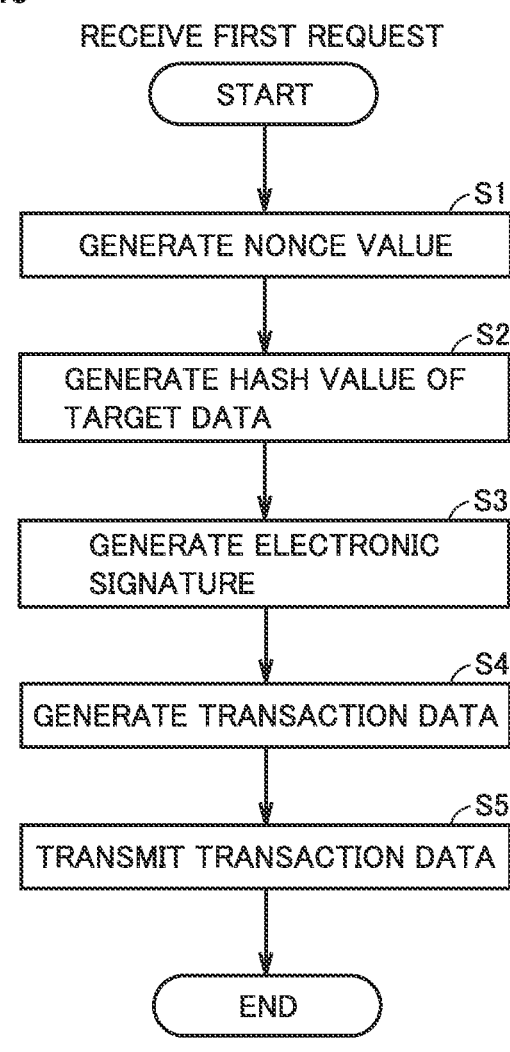
FIG. 9 is a flowchart showing a procedure in processing for generating transaction data at the time when a first request is received.

FIG. 9 is a flowchart showing a procedure in processing for generating transaction data at the time when the first request is received. Processing in the flowchart shown in FIG. 9 is performed by controller 21 when it receives the first request from input apparatus 25 or user terminal apparatus 7. Though an example in which each step (the step being abbreviated as "S" below) in the flowchart shown in FIG. 9 and FIGS. 10, 11, 12, and 13 which will be described later is performed by software processing by controller 21 is described, a part or the entirety thereof may be performed by hardware (electronic circuitry) provided in controller 21.

In S1, controller 21 generates a nonce value. The nonce value is used as a number of transaction data.

In S2, controller 21 reads target data from database 4 and generates a hash value of the target data.

In S3, controller 21 reads secret key 271 from storage device 27 and creates an electronic signature by encrypting with secret key 271, the hash value generated in S2. Controller 21 may create the electronic signature by encrypting with secret key 271, the nonce value generated in S1. Alternatively, controller 21 may create the electronic signature by encrypting with secret key 271, the hash value generated in S2 and the nonce value generated in S1.

In S4, controller 21 generates transaction data including such information as Key, Age, Obj-HV, Nonce, Sig, Prev-HV, and HV. Specifically, controller 21 sets ID information M1 included in the first request as Key. Controller 21 sets the nonce value generated in S1 as Nonce, sets the hash value generated in S2 as Obj-HV, and sets the electronic signature created in S3 as Sig. Controller 21 recognizes Age of the parent record by checking Key against distributed ledger set 50 and sets incremented Age of the parent record as Age. Controller 21 sets the record hash of the parent record as Prev-HV. Controller 21 hashes such information as Key, Age, Obj-HV, Nonce, Sig, and Prev-HV and sets the information as HV. Controller 21 may have time information on time at which the transaction data is broadcast toward network NW and/or sender information on the sender of the transaction data included in the transaction data.

In S5, controller 21 outputs to communication apparatus 24, a control signal for transmitting the transaction data generated in S4 to network NW. The transaction data is thus transmitted to network NW through communication apparatus 24.

Figure 10:
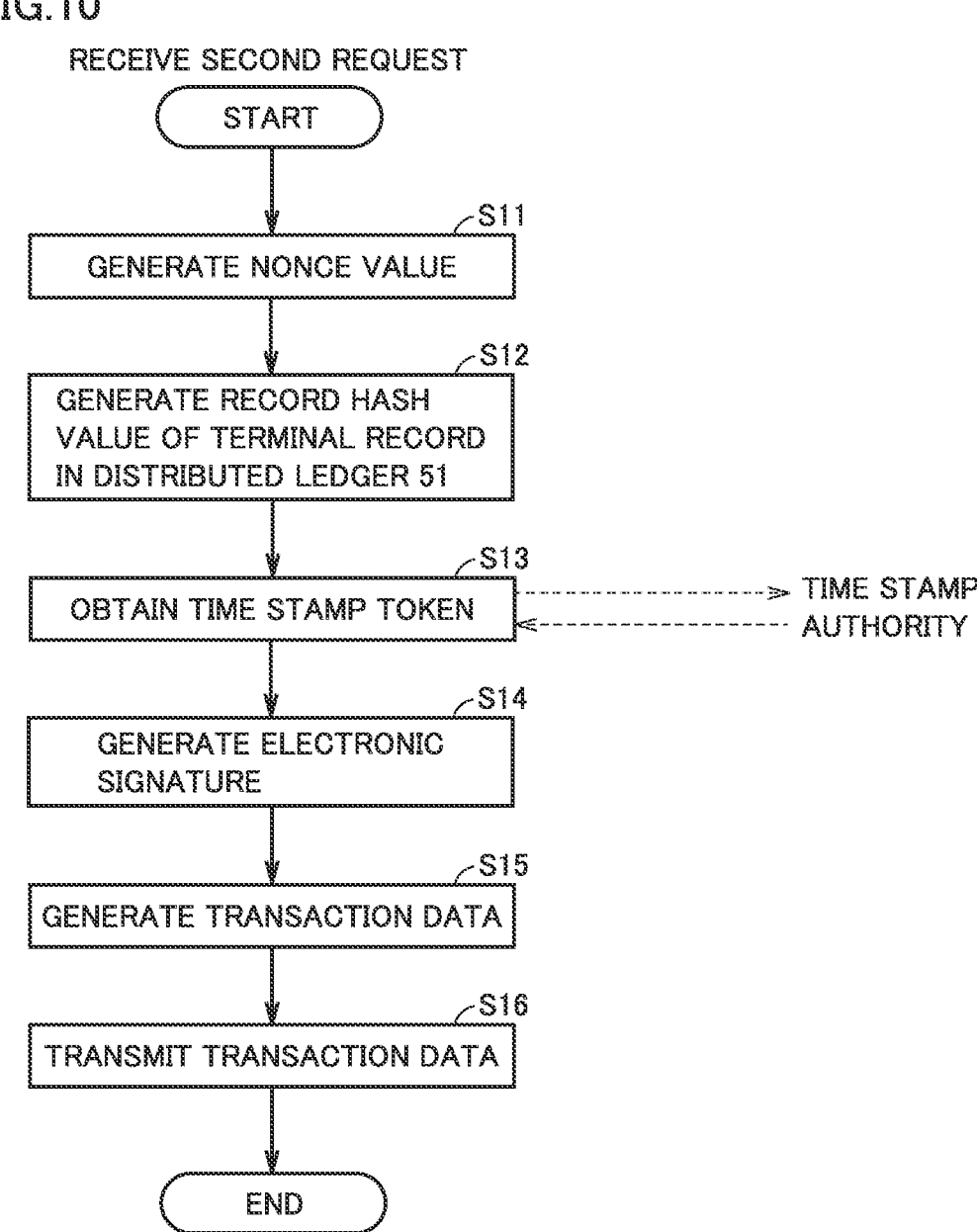
FIG. 10 is a flowchart showing a procedure in processing for generating transaction data at the time when a second request is received.

FIG. 10 is a flowchart showing a procedure in processing for generating transaction data at the time when the second request is received. Processing in the flowchart shown in FIG. 10 is performed by controller 21 when it receives the second request from input apparatus 25 or user terminal apparatus 7. Controller 21 may perform the processing in the flowchart shown in FIG. 10 when it senses addition of a record to distributed ledger 51.

In S11, controller 21 generates a nonce value. The nonce value is used as a number of transaction data.

In S12, controller 21 generates a record hash value of a terminal record in distributed ledger 51.

In S13, controller 21 outputs to communication apparatus 24, a control signal for transmitting the record hash value generated in S12 to time stamp authority 8. The record hash value is thus transmitted to time stamp authority 8 through communication apparatus 24. Time stamp authority 8 that has received the record hash value sends a time stamp token back to client server 2 which is the sender of the record hash value. Controller 21 obtains the time stamp token from time stamp authority 8 through communication apparatus 24.

In S14, controller 21 reads secret key 271 from storage device 27 and creates an electronic signature by encrypting with secret key 271, the time stamp token obtained in S13. Controller 21 may create the electronic signature by encrypting with secret key 271, the nonce value generated in S11. Alternatively, controller 21 may create the electronic signature by encrypting with secret key 271, the time stamp token obtained in S13 and the nonce value generated in S11.

In S15, controller 21 generates transaction data including such information as Key, Age, Obj-HV, Nonce, Sig, Prev-HV, and HV. Controller 21 sets ID information M3 (k2) included in the second request as Key. Controller 21 sets the time stamp token obtained in S13 as Obj-HV. Since other processing in S15 is basically similar to the processing in S4 in FIG. 9, description will not be repeated.

In S16, controller 21 outputs to communication apparatus 24, a control signal for transmitting the transaction data generated in S15 to network NW. The transaction data is thus transmitted to network NW through communication apparatus 24.

Figure 11:
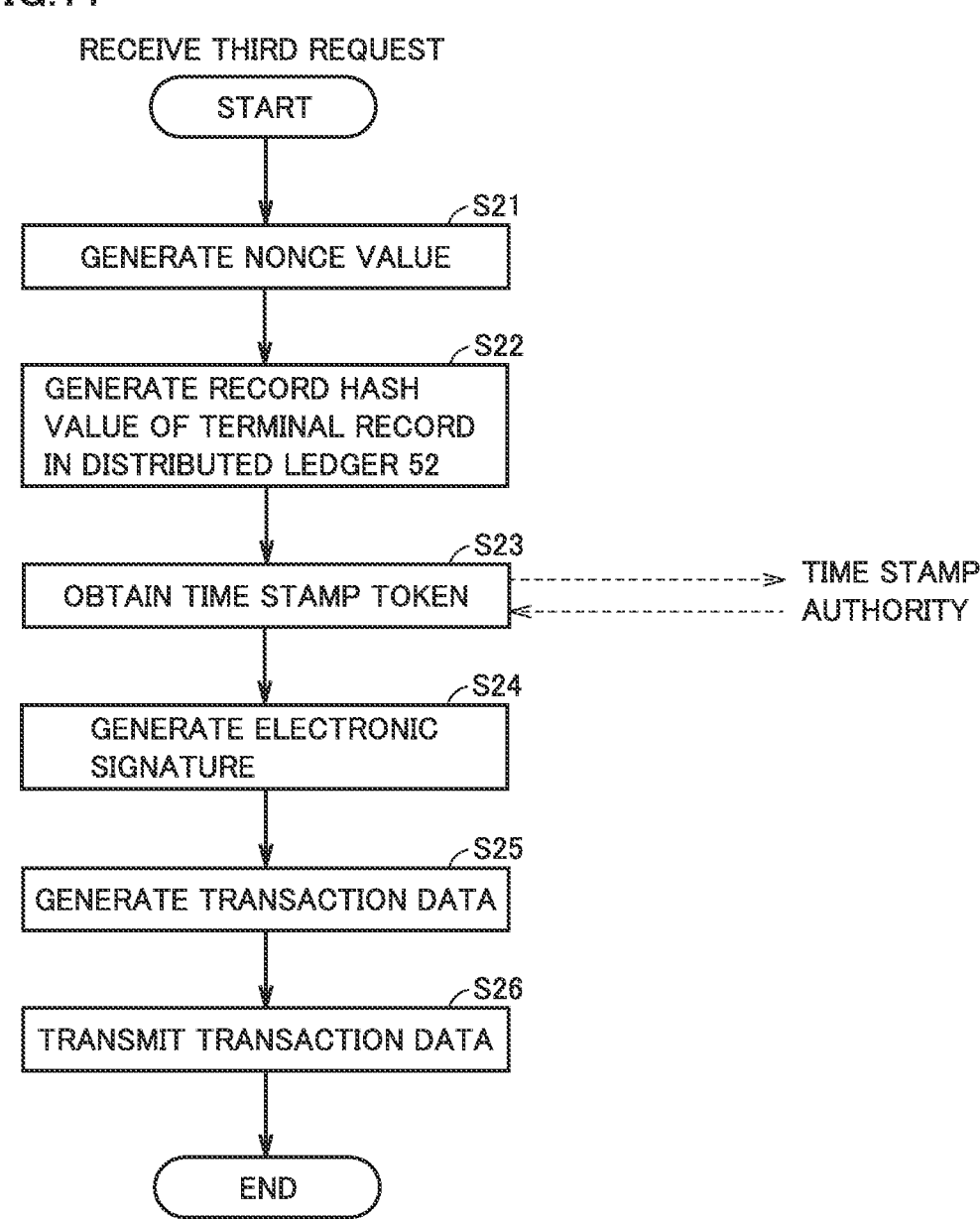
FIG. 11 is a flowchart showing a procedure in processing for generating transaction data at the time when a third request is received.

FIG. 11 is a flowchart showing a procedure in processing for generating transaction data at the time when the third request is received. Processing in the flowchart shown in FIG. 11 is performed by controller 21 when it receives the third request from input apparatus 25 or user terminal apparatus 7.

In S21, controller 21 generates a nonce value. The nonce value is used as a number of transaction data.

In S22, controller 21 generates a record hash value of a terminal record in distributed ledger 52.

In S23, controller 21 outputs to communication apparatus 24, a control signal for transmitting the record hash value generated in S22 to time stamp authority 8. The record hash value is thus transmitted to time stamp authority 8 through communication apparatus 24. Time stamp authority 8 that has received the record hash value sends a time stamp token back to client server 2 which is the sender of the record hash value. Controller 21 obtains the time stamp token from time stamp authority 8 through communication apparatus 24.

In S24, controller 21 reads secret key 271 from storage device 27 and creates an electronic signature by encrypting the time stamp token obtained in S23 with secret key 271. Controller 21 may create the electronic signature by encrypting the nonce value generated in S21 with secret key 271. Alternatively, controller 21 may create the electronic signature by encrypting the time stamp token obtained in S23 and the nonce value generated in S21 with secret key 271.

In S25, controller 21 generates transaction data including such information as Key, Age, Obj-HV, Nonce, Sig, Prev-HV, and HV. Controller 21 sets ID information M5 (k2) included in the third request as Key. Controller 21 sets the time stamp token obtained in S25 as Obj-HV. Since other processing in S25 is basically similar to the processing in S4 in FIG. 9, description will not be repeated.

In S26, controller 21 outputs to communication apparatus 24, a control signal for transmitting the transaction data generated in S25 to network NW. The transaction data is thus transmitted to network NW through communication apparatus 24.

Figure 12:
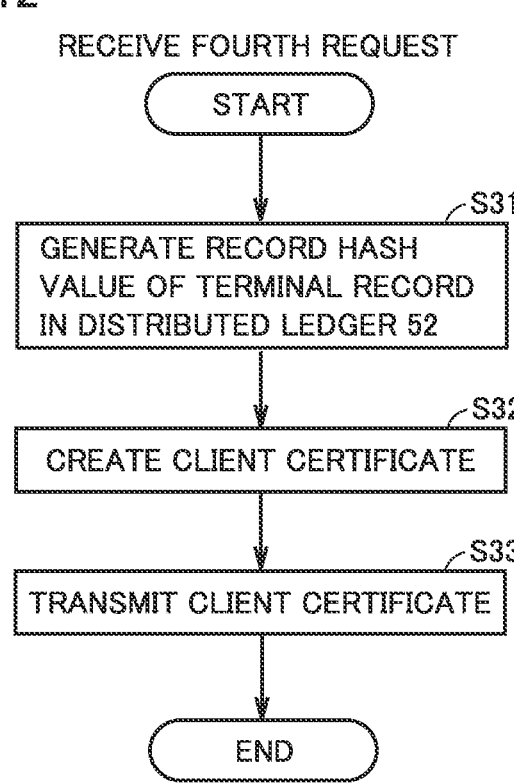
FIG. 12 is a flowchart showing a procedure in processing at the time when a fourth request is received.

FIG. 12 is a flowchart showing a procedure in processing at the time when the fourth request is received. Processing in the flowchart shown in FIG. 12 is performed by controller 21 when it receives the fourth request from input apparatus 25 or user terminal apparatus 7.

In S31, controller 21 generates a record hash value of a terminal record in distributed ledger 52.

In S32, controller 21 creates a client certificate including the record hash value generated in S31. Controller 21 may have information for identifying the A company itself included in the client certificate.

In S33, controller 21 outputs to communication apparatus 24, a control signal for transmitting the client certificate created in S32 to external server 9. The client certificate is thus transmitted to external server 9 through communication apparatus 24.

Figure 13:
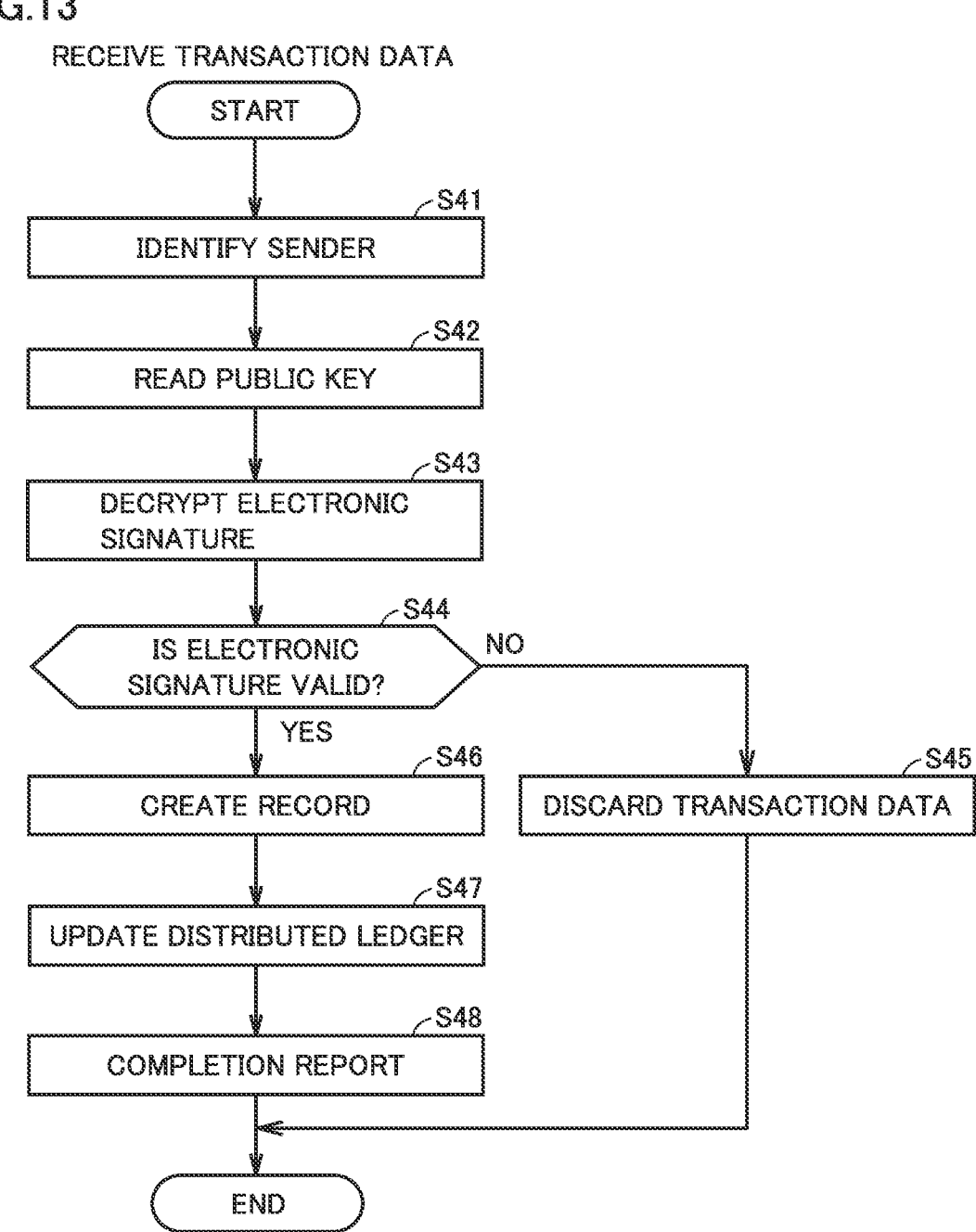
FIG. 13 is a flowchart showing a procedure in processing performed at the time when transaction data is received.

FIG. 13 is a flowchart showing a procedure in processing performed at the time when the transaction data is received. Processing in the flowchart shown in FIG. 13 is performed by controller 21 when it receives the transaction data.

In S41, controller 21 identifies based on sender information included in the received transaction data, client server 2 which is the sender of the transaction data.

In S42, controller 21 reads the public key of client server 2 identified in S41 from storage device 27.

In S43, controller 21 decrypts the electronic signature included in the transaction data with the public key read in S42.

In S44, controller 21 verifies validity of the electronic signature decrypted in S43. Specifically, controller 21 compares a value resulting from decryption of the electronic signature with Obj-HV (the hash value or the time stamp token) included in the transaction data. When they do not match with each other, controller 21 does not acknowledge validity of the electronic signature (NO in S44) and has the process proceed to S45. When they match with each other, controller 21 acknowledges validity of the electronic signature (YES in S44) and has the process proceed to S46.

In S45, controller 21 discards the presently received transaction data and quits the process because the electronic signature is invalid. Controller 21 may have the possibility of tampering of the transaction data shown on display apparatus 26. Alternatively, controller 21 may transmit an indication of the possibility of tampering of the transaction data to client server 2 which is the sender of the transaction data.

In S46, controller 21 reads such information as Key, Age, Obj-HV, Nonce, Sig, Prev-HV, and HV from the received transaction data and creates a record including the information.

In S47, controller 21 identifies based on Key in the record created in S46, a distributed ledger to which the record is to be added. Then, controller 21 adds the record to the identified distributed ledger. Distributed ledger set 50 is thus updated.

In S48, controller 21 transmits a notification (a completion report) indicating completion of transaction processing to client server 2 which is the sender of the transaction data.

As set forth above, in data management system 1 according to the first embodiment, distributed ledger set 50 including two distributed ledgers 51 and 52 is held in client server 2. Distributed ledger 51 is the proof chain for proving existence of the target data and distributed ledger 52 is the proof chain for proving existence of the time stamp token.

Each time target data is updated, a record including a hash value thereof is stored in distributed ledger 51. Since the record including the hash value of the target data is managed by means of distributed ledger 51, tamper resistance of the target data can be enhanced. The record stored in distributed ledger 51 includes the hash value of the target data, rather than the target data itself. The target data itself can thus be concealed from other client servers 2 that form network NW.

As a record is added to distributed ledger 51 and the second operation is performed, the time stamp token is obtained for the record hash value of the added record (the terminal record in distributed ledger 51) and the record including the time stamp token is stored in distributed ledger 52. By storing the time stamp token in distributed ledger 52, tamper resistance of the time stamp token can be enhanced. By storing the time stamp token in distributed ledger 52, even when there is an expired time stamp token, records subsequent to the record including that time stamp token can prove that the expired time stamp token has not been tampered. Since validity of the expired time stamp token can thus be proven, the expiration date of the time stamp token can substantially be extended.

Furthermore, the time stamp token is obtained for the record hash value of the terminal record in distributed ledger 52. Since integrity of the record hash value can thus be proven, by proving that the record hash value has not been tampered, the fact that a series of time stamp tokens stored in distributed ledger 52 has not been tampered can be proven.

In addition, by storing the time stamp token obtained for the record hash value of the terminal record in distributed ledger 52, tamper resistance of the time stamp token can be enhanced.

The client certificate including the record hash value of the terminal record in distributed ledger 52 is created, and the client certificate is separated from client server 2 and managed in external server 9. Thus, even when all records in distributed ledger set 50 are tampered, the fact that distributed ledger set 50 has been tampered can be proven by the client certificate managed in external server 9.

[First Modification]

In the first embodiment, an example in which a single component (a component that composes the vehicle) is managed in data management system 1 is described. A plurality of components, however, may be managed in data management system 1. For example, N (being a natural number equal to or larger than two) components may be managed in data management system 1. In this case, distributed ledger set 50 includes N distributed ledgers serving as proof chains of N respective components and a distributed ledger serving as a proof chain of the time stamp token. When any one of the N distributed ledgers is updated and the second operation is performed also in the first modification, a time stamp token is obtained for a record hash value of a terminal record in the distributed ledger and a record including the time stamp token is stored in the distributed ledger which is the proof chain of the time stamp token. Then, in response to the third operation and the fourth operation as in the first embodiment, an effect the same as in the first embodiment can be achieved.

Second Embodiment

An example in which platform server 5 performs a function to permit participation into network NW is described in the first embodiment. Then, finality of transaction data is given by confirmation of validity of the electronic signature between client servers 2 permitted to participate in network NW. In a second embodiment, an example in which a platform server 6 performs a function to give finality to transaction data in addition to the function to permit participation into network NW will be described.

Figure 14:
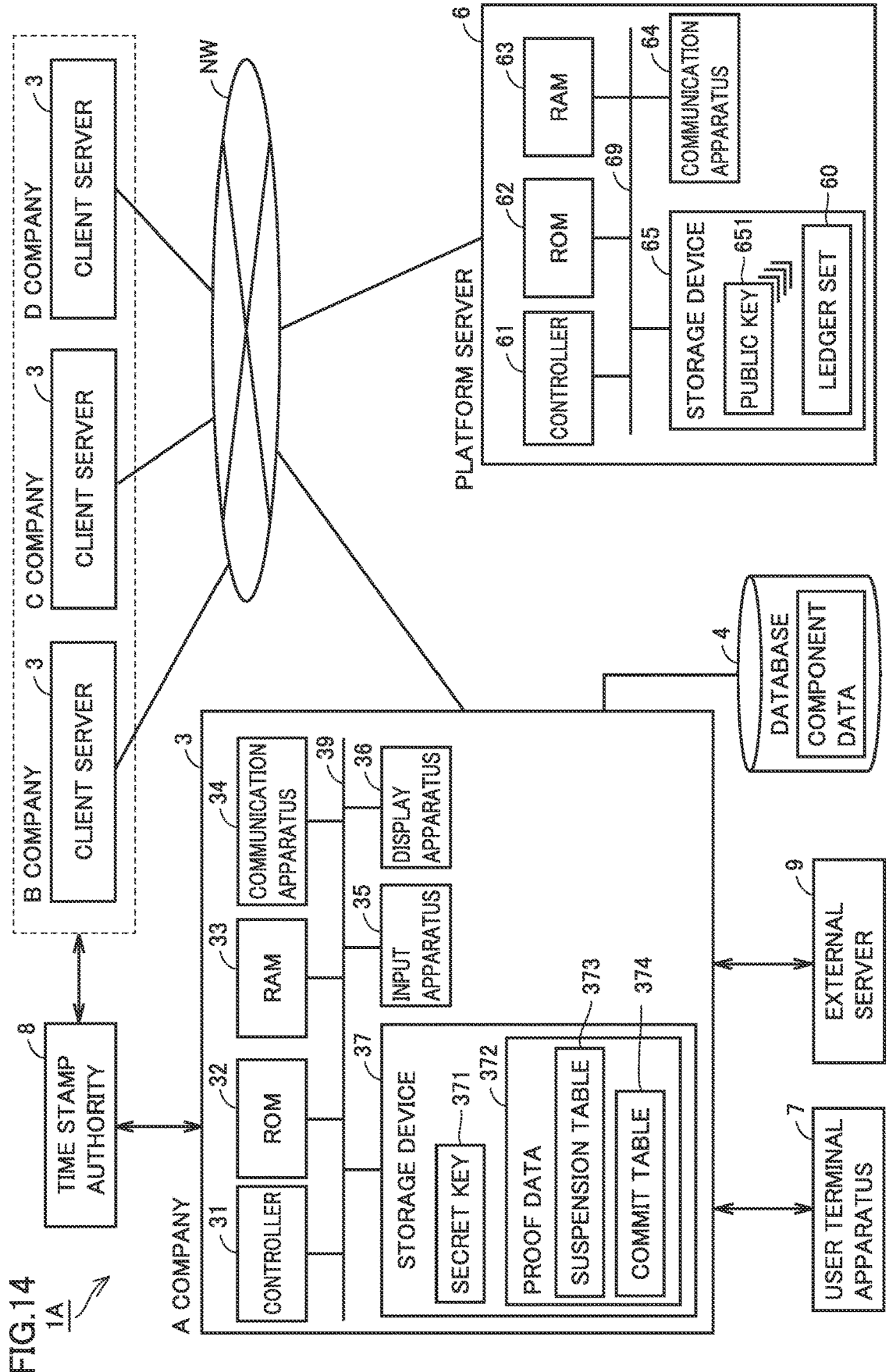
FIG. 14 is a diagram showing a schematic configuration of a data management system according to a second embodiment.

FIG. 14 is a diagram showing a schematic configuration of a data management system 1A according to the second embodiment. Data management system 1A includes four client servers 3, platform server 6, time stamp authority 8, and external server 9. As in the first embodiment, four client servers 3 are servers belonging to different companies (for example, the A company, the B company, the C company, and the D company). Though client server 3 of the A company will representatively be described below, client servers 3 of the B company, the C company, and the D company are also similar in function.

Similarly to platform server 5 according to the first embodiment, platform server 6 manages network NW and accepts an application to participate in network NW from each client server 3. Platform server 6 permits participation of client server 3 into network NW based on an operation to permit participation by a manager of platform server 6 or based on a result of determination as to a prescribed condition. Participation of four client servers 3 belonging to the A company, the B company, the C company, and the D company into network NW is permitted also in the second embodiment.

Four client servers 3 and platform server 6 form network NW. Software based on the distributed ledger has been introduced in each of client servers 3, and as the introduced software based on the distributed ledger functions, each of client servers 3 functions as a node. Client server 3 is configured to communicate with user terminal apparatus 7 similarly to client server 2 according to the first embodiment.

Similarly to client server 2 according to the first embodiment, database 4 is connected to client server 3. Client server 3 (a controller 31) generates a control signal for registering/updating target data and outputs the control signal to database 4 in response to an input to an input apparatus 35 or a request from user terminal apparatus 7.

As client server 3 has component data registered in database 4/updates component data in database 4, it creates a hash value of the component data and generates transaction data for storing the hash value in a ledger held in platform server 6 and a distributed ledger (a commit table which will be described later) held in each client server 3. Then, client server 3 transmits the generated transaction data to platform server 6.

Platform server 6 performs a function to give finality to the transaction data. A ledger set 60 is held in platform server 6, and platform server 6 processes transaction data received from client server 3 and updates ledger set 60. As platform server 6 updates ledger set 60, it transmits a record (a proof record which will be described later) added to the ledger by updating to all client servers 3 that participate in network NW. A commit table 374 where a commit record is stored is stored in client server 3. Commit table 374 corresponds to an exemplary "distributed ledger" according to the present disclosure.

FIG. 15 is a diagram showing an exemplary configuration of ledger set 60. Ledger set 60 includes a ledger 67 and a ledger 68. Similarly to distributed ledger 51 according to the first embodiment, a state of update of the target data is stored in a time-series manner in ledger 67, and ledger 67 forms a proof chain of the target data. Similarly to distributed ledger 52 according to the first embodiment, a time stamp token is stored in a time-series manner in ledger 68, and ledger 68 forms a proof chain of the time stamp token. Since ledger set 60, ledger 67, and ledger 68 are similar in configuration to distributed ledger set 50, distributed ledger 51, and distributed ledger 52 according to the first embodiment, respectively, detailed description thereof will not be repeated. FIG. 15 shows a data structure of ledgers 67 and 68 corresponding to the example shown in FIG. 3. In other words, a record of Age "2" is stored in each of ledgers 67 and 68 as the latest (terminal) record.

Referring again to FIG. 14, client server 3 includes controller 31, a ROM 32, a RAM 33, a communication apparatus 34, input apparatus 35, a display apparatus 36, and a storage device 37. Controller 31, ROM 32, RAM 33, communication apparatus 34, input apparatus 35, display apparatus 36, and storage device 37 are connected to a bus 39. Since ROM 32, RAM 33, communication apparatus 34, input apparatus 35, and display apparatus 36 are basically similar in configuration to ROM 22, RAM 23, communication apparatus 24, input apparatus 25, and display apparatus 26 of client server 2 according to the first embodiment, description thereof will not be repeated.

A secret key 371 and proof data 372 are stored in storage device 37. Secret key 371 is a secret key of the A company. For example, in participation of client server 3 into network NW for the first time, controller 31 generates a secret key and a public key. Then, controller 31 transmits the generated public key to an authentication bureau (not shown) and has the public key authenticated. The authentication bureau issues an electronic certificate including information on the public key. Controller 31 has secret key 371 corresponding to the authenticated public key stored in storage device 37. Controller 31 transmits an authenticated public key (electronic certificate) 651 to platform server 6.

Proof data 372 includes a suspension table 373 and commit table 374. FIG. 16 is a diagram for illustrating an exemplary configuration of suspension table 373. FIG. 17 is a diagram for illustrating an exemplary configuration of commit table 374. Suspension table 373 and commit table 374 each includes a configuration adapted to ledger set 60.

Referring to FIG. 16, suspension table 373 includes a prescribed type of information included in transaction data that has not been used. Specifically, for example, a suspension record including such information as Key and Nonce is stored in suspension table 373. Of information included in the transaction data generated in response to various requests (the first request to the third request), controller 31 has such information as Key and Nonce stored as the suspension record in suspension table 373. When the first request to the third request are not particularly distinguished from one another, the first request to the third request will also collectively be referred to as an "update request" below.

The update request received by client server 3 from input apparatus 35 or user terminal apparatus 7 includes information on an ID for identifying a distributed ledger to which a record is to be added. For example, the first request includes ID information M1 indicating "k1". The second request includes ID information M3 indicating "k2". The third request includes ID information M5 indicating "k2". In other words, the ID for identifying the distributed ledger to which a record is to be added, that is included in the update request, is set as Key. When controller 31 receives the update request, it generates a nonce value. The nonce value indicates a number of the update request (that is, a number of transaction data). Controller 31 creates the suspension record including such information as Key and Nonce and has the suspension record registered in suspension table 373. FIG. 16 shows an example in which the suspension record including Key set to k1 is registered in suspension table 373.

When processing for responding to the update request is performed (that is, transaction data is used), controller 31 deletes the suspension record including Key information similar to Key included in the transaction data used for performing transaction processing from suspension table 373.

A suspension record including the same Key information is not redundantly registered in suspension table 373. In registration of the suspension record in suspension table 373, controller 31 determines whether or not a suspension record including Key that matches with Key included in the suspension record to be registered has already been registered in suspension table 373. When the suspension record including Key that matches with Key included in the suspension record to be registered has not been registered in suspension table 373, controller 31 has the suspension record registered in suspension table 373. When the suspension record including Key that matches with Key included in the suspension record to be registered has been registered in suspension table 373, controller 31 waits for deletion of the suspension record including matching Key from suspension table 373. In other words, in the example shown in FIG. 16, the suspension record including Key set to k2 can be registered in suspension table 373, whereas the suspension record including Key set to k1 cannot be registered.

Referring to FIG. 17, commit table 374 includes a prescribed type of information included in used transaction data. Specifically, a commit record including such information as Key, Age, Obj-HV, Nonce, Sig, Prev-HV, and HV is stored in commit table 374. In the second embodiment, the commit record includes information similar to that in the record in ledger set 60. Commit table 374 includes commit data 375 where a commit record including Key set to k1 is stored and commit data 376 where a commit record including Key set to k2 is stored.

As platform server 6 performs transaction processing to update the ledger in ledger set 60, it creates the proof record and transmits the proof record to all client servers 3 that participate in network NW. The proof record is, for example, a record including such information as Key, Age, Obj-HV, Nonce, Sig, Prev-HV, and HV, that is included in a record added to the ledger by transaction processing performed with the use of the transaction data.

As controller 31 receives the proof record, it adds the proof record to commit table 374 (commit data 375 or commit data 376) as the commit record. Then, controller 31 deletes the suspension record including Key similar to Key included in the added commit record from suspension table 373.

Referring again to FIG. 14, platform server 6 includes a controller 61, a ROM 62, a RAM 63, a communication apparatus 64, and a storage device 65. Controller 61, ROM 62, RAM 63, communication apparatus 64, and storage device 65 are connected to a bus 69.

Controller 61 is implemented by an integrated circuit including a CPU. Controller 61 develops various programs stored in ROM 62 on RAM 63 and executes the programs. The various programs include an operating system and the like. RAM 63 functions as a working memory, and various types of data necessary for execution of various programs are temporarily stored therein. Controller 61 receives transaction data from client server 3 and performs transaction processing.

Communication apparatus 64 is configured to communicate with client server 3 that participates in network NW.

A plurality of public keys 651 and ledger set 60 are stored in storage device 65. The plurality of public keys 651 include public keys of companies that manage client servers 3 that participate in network NW. Specifically, the plurality of public keys 651 include the public key of the A company, the public key of the B company, the public key of the C company, and the public key of the D company.

Since ledger set 60 is similar in configuration to distributed ledger set 50 according to the first embodiment as described above, description will not be repeated.

Processing for responding to the update request in the second embodiment will sequentially be described below with reference to a flowchart.

Figure 18:
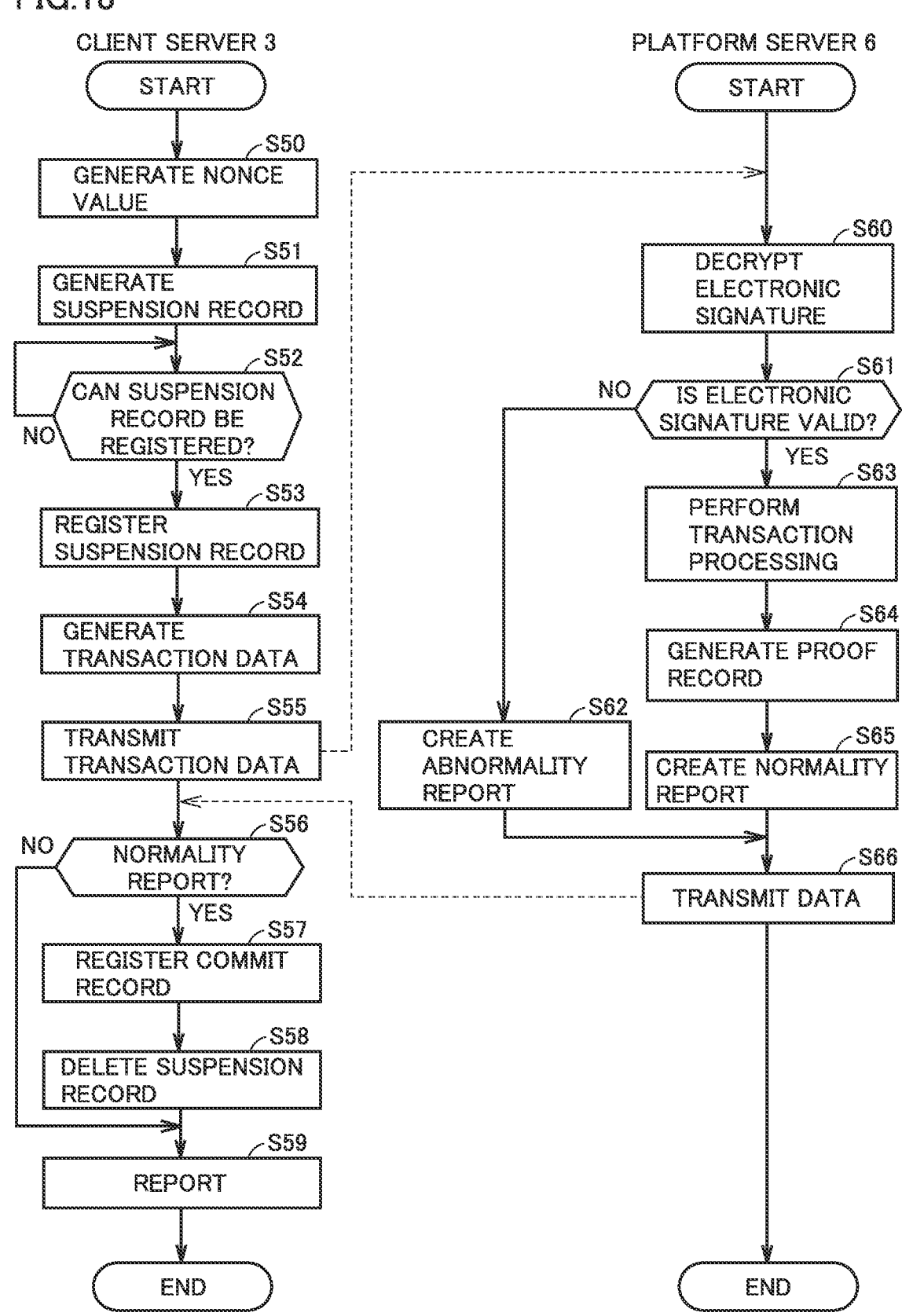
FIG. 18 is a flowchart showing a procedure in processing performed in the data management system at the time when an update request is received.

FIG. 18 is a flowchart showing a procedure in processing performed in data management system 1A at the time when the update request is received. Processing in the flowchart shown in FIG. 18 is started by controller 31 of client server 3 when it receives the update request from input apparatus 25 or user terminal apparatus 7.

In S50, controller 31 of client server 3 generates a nonce value. The nonce value is used as a number of transaction data generated in response to the update request.

In S51, controller 31 of client server 3 generates a suspension record. Specifically, controller 31 of client server 3 reads an ID of a distributed ledger to which a record is to be added, that is included in the update request, and generates the suspension record with the ID being set as Key information and with the nonce value generated in S50 being set as Nonce information.

In S52, controller 31 of client server 3 determines whether or not the suspension record generated in S51 can be registered in suspension table 373. When a suspension record including Key information similar to that in the suspension record generated in S51 has been registered in suspension table 373, controller 31 of client server 3 makes negative determination (NO in S52) and waits for deletion of the suspension record including similar Key information from suspension table 373. When a suspension record including Key information similar to that in the suspension record generated in S51 has not been registered in suspension table 373, controller 31 of client server 3 makes affirmative determination (YES in S52) and has the process proceed to S53.

In S53, controller 31 of client server 3 has the suspension record registered in suspension table 373.

In S54, controller 31 of client server 3 generates transaction data for responding to the update request. Specifically, when the update request falls under the first request, controller 31 of client server 3 performs processing similar to the processing in S2 to S4 described with reference to FIG. 9 to generate transaction data. When the update request falls under the second request, it performs processing similar to the processing in S12 to S15 described with reference to FIG. 10 to generate transaction data. When the update request falls under the third request, controller 31 of client server 3 performs processing similar to the processing in S22 to S25 described with reference to FIG. 11 to generate transaction data. Since details of the processing are as described with reference to FIGS. 9, 10, and 11, description will not be repeated.

In S55, controller 31 of client server 3 outputs to communication apparatus 34, a control signal for transmitting the transaction data generated in S54 to platform server 6. The transaction data is thus transmitted to platform server 6 through communication apparatus 34.

In S60, controller 61 of platform server 6 decrypts the electronic signature for verifying validity of the electronic signature included in the received transaction data. Specifically, controller 61 of platform server 6 performs processing similar to the processing in S41 to S43 described with reference to FIG. 13 to decrypt the electronic signature. Since details of the processing are as described with reference to FIG. 13, description will not be repeated.

In S61, controller 61 of platform server 6 verifies validity of the electronic signature decrypted in S60. Specifically, controller 61 of platform server 6 compares the value obtained by decryption of the electronic signature with the hash value included in the transaction data (in the transaction data generated in response to the first request, the hash value of the target data, and in the transaction data generated in response to the second request and the third request, the time stamp token). When they do not match with each other, controller 61 of platform server 6 does not acknowledge validity of the electronic signature (NO in S61) and has the process proceed to S62. When they match with each other, controller 61 of platform server 6 acknowledges validity of the electronic signature (YES in S61) and has the process proceed to S63.

In S62, controller 61 of platform server 6 determines that the transaction data received from client server 3 may have been tampered, and discards the transaction data and creates an abnormality report indicating possibility of tampering. Then, controller 61 of platform server 6 has the process proceed to S66.

In S63, controller 61 of platform server 6 performs transaction processing. Specifically, controller 61 of platform server 6 performs processing similar to the processing in S46 and S47 described with reference to FIG. 13 to generate a record in the ledger identified by Key information included in the transaction data, to add the generated record to the ledger, and to update ledger set 60.

In S64, controller 61 of platform server 6 generates a proof record. The proof record includes such information as Key, Age, Obj-HV, Nonce, Sig, Prev-HV, and HV included in the record added to the ledger.

In S65, controller 61 of platform server 6 creates a normality report indicating completion of update of ledger set 60 (that is, processing of the transaction data). Controller 61 of platform server 6 has the proof record included in the normality report.

In S66, controller 61 of platform server 6 outputs to communication apparatus 64, a control signal for transmitting the abnormality report created in S62 or the normality report created in S65 to client server 3. The abnormality report or the normality report is thus transmitted to client server 3 through communication apparatus 64.

In S66, controller 61 of platform server 6 outputs to communication apparatus 64, a control signal for transmitting the proof record to client servers 3 (for example, client servers 3 of the B company, the C company, and the D company) other than the sender of the transaction data. The proof record is thus transmitted to other client servers 3 through communication apparatus 64.

In S56, controller 31 of client server 3 determines whether or not it has received the normality report from platform server 6. When controller 31 of client server 3 determines that it has received the normality report (YES in S56), it has the process proceed to S57. When controller 31 of client server 3 determines that it has not received the normality report, that is, it has received the abnormality report (NO in S56), it has the process proceed to S59.

In S57, controller 31 of client server 3 adds the proof record included in the normality report to commit table 374 as the commit record. Specifically, controller 31 of client server 3 determines whether the commit record is to be added to commit data 375 or commit data 376 based on Key information in the proof record. Then, controller 31 of client server 3 adds the commit record to the target commit data.

In S58, controller 31 of client server 3 deletes the suspension record including the Key information the same as that in the added commit record from suspension table 373.

In S59, controller 31 of client server 3, for example, has a result of processing for the update request shown on display apparatus 36 or transmits the result to user terminal apparatus 7.

As other client servers 3 (client servers 3 of the B company, the C company, and the D company) that have received the proof record transmitted in S66 similarly also add the proof record to respective commit tables 374, commit tables 374 are updated.

Figure 19:
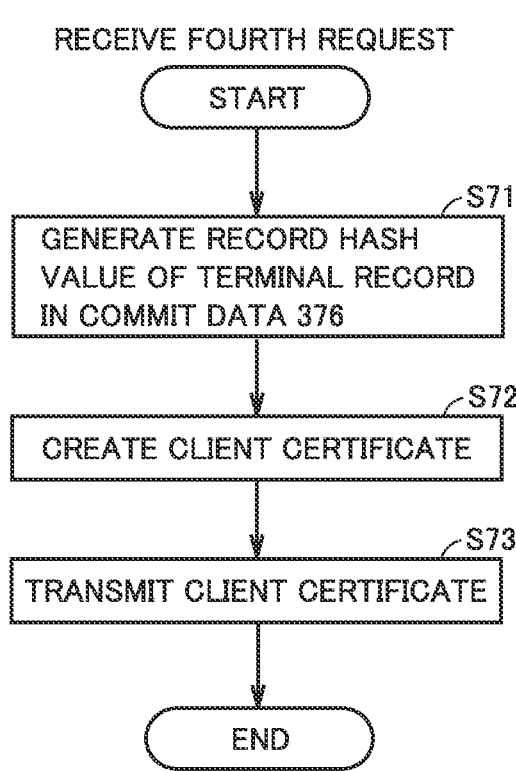
FIG. 19 is a flowchart showing a procedure in processing at the time when a fourth request is received in the second embodiment.

FIG. 19 is a flowchart showing a procedure in processing at the time when the fourth request is received in the second embodiment. Processing in the flowchart shown in FIG. 19 is performed by controller 31 when it receives the fourth request from input apparatus 35 or user terminal apparatus 7.

In S71, controller 31 generates a record hash value of a terminal record in commit data 376.

In S72, controller 31 creates a client certificate including the record hash value generated in S71. Controller 31 may have information for identifying the A company itself included in the client certificate.

In S73, controller 31 outputs to communication apparatus 24, a control signal for transmitting the client certificate created in S72 to external server 9. The client certificate is thus transmitted to external server 9 through communication apparatus 24.

As set forth above, in data management system 1A according to the second embodiment, platform server 6 gives finality to the transaction data. Ledger set 60 including two ledgers 67 and 68 is held in platform server 6. The state of update of the target data is stored in the time-series manner in ledger 67, and the time stamp token is stored in the time-series manner in ledger 68. Then, as ledger set 60 is updated, the proof record including information on the record added to ledger set 60 is sent from platform server 6 to each client server 3. Each of client servers 3 adds the proof record to commit table 374 as the commit record. Commit table 374 corresponds to distributed ledger set 50 according to the first embodiment. As client servers 3 hold their commit tables 374 between each other, tamper resistance of commit table 374 is enhanced.

In the configuration of data management system 1A according to the second embodiment as well, by obtaining the time stamp token for the record hash value of the terminal record in commit data 375 (ledger 67) in response to the second request and storing the record including the time stamp token in commit data 376 (ledger 68), validity of the expired time stamp token can be proven as in the first embodiment.

Furthermore, by obtaining the time stamp token for the record hash value of the terminal record in commit data 376 (ledger 68), integrity of the record hash value can be proven. Therefore, by proving the fact that the record hash value has not been tampered, the fact that a series of time stamp tokens stored in commit data 376 (ledger 68) has not been tampered can be proven.

In addition, by storing in commit data 376 (ledger 68), the time stamp token obtained for the record hash value of the terminal record in commit data 376 (ledger 68), tamper resistance of the time stamp token can be enhanced.

The client certificate including the record hash value of the terminal record in commit data 376 is created, and separated from client server 3 and managed in external server 9. Thus, even when all records in commit table 374 and ledger set 60 are tampered, the fact that commit table 374 and ledger set 60 have been tampered can be proven by the client certificate managed in external server 9.

[Second Modification]

An example in which commit table 374 includes information similar to information included in ledger set 60 is described in the second embodiment. Specifically, each of pieces of commit data 375 and 376 in commit table 374 includes such information as Key, Age, Obj-HV, Nonce, Sig, Prev-HV, and HV. A part of information included in ledger set 60 may be in commit table 374. For example, each of pieces of commit data 375 and 376 in commit table 374 may include such information as Key, Age, Obj-HV, HV, and Nonce, of such information as Key, Age, Obj-HV, Nonce, Sig, Prev-HV, and HV in each of ledgers 67 and 68 in ledger set 60. In this case, the proof record is also generated to include such information as Key, Age, Obj-HV, HV, and Nonce. In other words, commit data 375 and 376 are summaries of respective ledgers 67 and 68. By preparing commit data 375 and 376 as the summaries of respective ledgers 67 and 68, a capacity of data stored in storage device 37 of client server 3 can be suppressed as compared with an example where commit data 375 and 376 include information similar to that in ledgers 67 and 68.

Though embodiments of the present disclosure have been described above, it should be understood that the embodiments disclosed herein are illustrative and non-restrictive in every respect. The technical scope of the present disclosure is defined by the terms of the claims and is intended to include any modifications within the scope and meaning equivalent to the terms of the claims.

What is claimed is:

1. A data management apparatus that manages data based on a distributed ledger technology, the data management apparatus comprising:

a storage device where a distributed ledger set is stored;

a controller that updates the distributed ledger set; and a communication apparatus configured to communicate with a time stamp authority that provides a time stamp token, wherein:

the distributed ledger set includes a first distributed ledger where a record including information on the data is stored in a time-series manner, and a second distributed ledger that is separate and distinct from the first distributed ledger and where a record including the time stamp token is stored in a time-series manner, and the controller

US 12,681,669 B2

29
30 obtains, from the time stamp authority through the communication apparatus, a first time stamp token for a time at which the controller accesses the first distributed ledger to generate a hash value from a most recent terminal record stored in the first distributed ledger, and stores, in the second distributed ledger, a record including (i) the first time stamp token verifying the time at which the controller accessed the first distributed ledger, (ii) the hash value generated from the most recent terminal record in the first distributed ledger, and (iii) a hash value of a previous record stored in the second distributed ledger.

2. The data management apparatus according to claim 1, wherein the controller obtains, from the time stamp authority, the first time stamp token in accordance with an operation by a user onto the data management apparatus.

3. The data management apparatus according to claim 1, wherein when a record is added to the first distributed ledger, the controller obtains, from the time stamp authority, the first time stamp token for the time at which the controller accesses the first distributed ledger to generate the hash value from the most recent terminal record which is the added record in the first distributed ledger.

4. The data management apparatus according to claim 1, wherein the controller obtains, from the time stamp authority through the communication apparatus, a second time stamp token for a time at which the controller accesses the second distributed ledger to generate a hash value of a terminal record stored in the second distributed ledger, and stores, in the second distributed ledger, a record including the second time stamp token.

5. The data management apparatus according to claim 4, wherein the controller obtains the second time stamp token in accordance with an operation by a user onto the data management apparatus.

6. The data management apparatus according to claim 4, wherein the controller obtains the second time stamp token as a prescribed time period elapses from a time point of previous obtainment of another time stamp token.

7. The data management apparatus according to claim 1, wherein the communication apparatus is further configured to communicate with an external server different from the data management apparatus, and the controller transmits to the external server through the communication apparatus, a hash value on a terminal record in the second distributed ledger at a prescribed time point.

8. The data management apparatus according to claim 1, wherein the second distributed ledger that is separate and distinct from the first distributed ledger, stores a chain of records, each record in the chain including a respective time stamp token along with a hash value of a respective terminal record in the first distributed ledger at each time point corresponding to the respective time stamp token.

9. The data management apparatus according to claim 1, wherein the controller accesses the first distributed ledger to generate the hash value from the most recent terminal record in the first distributed ledger each time a new record is added to the first distributed ledger.

10. The data management apparatus according to claim 1, wherein the controller accesses the first distributed ledger to generate the hash value from the most recent terminal record in the first distributed ledger every prescribed times of addition of a record to the first distributed ledger.

11. The data management apparatus according to claim 1, wherein the controller accesses the first distributed ledger to generate the hash value from the most recent terminal record in the first distributed ledger after lapse of a first prescribed time period since the controller accessed the first distributed ledger previously.

12. A data management method by using a data management apparatus that manages data based on a distributed ledger technology, the data management apparatus including a storage device where a distributed ledger set is stored, a controller that updates the distributed ledger set, and a communication apparatus configured to communicate with a time stamp authority that provides a time stamp token, the distributed ledger set including a first distributed ledger where a record including information on the data is stored in a time-series manner, and a second distributed ledger that is separate and distinct from the first distributed ledger and where a record including the time stamp token is stored in a time-series manner, the data management method comprising:

obtaining, from the time stamp authority through the communication apparatus, a first time stamp token for a time at which the data management apparatus accesses the first distributed ledger to generate a hash value from a most recent terminal record stored in the first distributed ledger; and storing, in the second distributed ledger, a record including (i) the first time stamp token verifying the time at which the controller accessed the first distributed ledger, (ii) the hash value generated from the most recent terminal record in the first distributed ledger, and (iii) a hash value of a previous record stored in the second distributed ledger.

13. The data management method according to claim 12, further comprising:

obtaining from the time stamp authority through the communication apparatus, a second time stamp token for a time at which the data management apparatus accesses the second distributed ledger to generate a hash value of a terminal record stored in the second distributed ledger; and storing, in the second distributed ledger, a record including the second time stamp token.

* * * * *